US008834269B2

United States Patent
Kishimoto et al.

(10) Patent No.: US 8,834,269 B2
(45) Date of Patent: Sep. 16, 2014

(54) PROGRAM, GAME DEVICE AND METHOD OF CONTROLLING THE SAME

(75) Inventors: Morio Kishimoto, Tokyo (JP); Takuma Komatsu, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 0 days.

(21) Appl. No.: 13/699,318

(22) PCT Filed: Apr. 12, 2011

(86) PCT No.: PCT/JP2011/059083
§ 371 (c)(1),
(2), (4) Date: Nov. 21, 2012

(87) PCT Pub. No.: WO2011/148727
PCT Pub. Date: Dec. 1, 2011

(65) Prior Publication Data
US 2013/0072300 A1 Mar. 21, 2013

(30) Foreign Application Priority Data

May 25, 2010 (JP) ................................. 2010-119781

(51) Int. Cl.
*A63F 9/24* (2006.01)
*A63F 13/00* (2014.01)
(52) U.S. Cl.
USPC ................................. 463/32; 463/30; 463/31
(58) Field of Classification Search
USPC ............... 463/1–4, 6, 30–33, 40–43
See application file for complete search history.

(56) References Cited

U.S. PATENT DOCUMENTS

| | | | |
|---|---|---|---|
| 5,513,307 A | 4/1996 | Naka et al. | |
| 6,175,366 B1 | 1/2001 | Watanabe et al. | |
| 6,390,918 B1 * | 5/2002 | Yagi et al. | 463/32 |
| 2007/0032297 A1 * | 2/2007 | Hara | 463/32 |
| 2009/0280898 A1 | 11/2009 | Izumi | |
| 2011/0039618 A1 * | 2/2011 | Ichiyanagi et al. | 463/31 |
| 2012/0115609 A1 | 5/2012 | Sugiyama et al. | |

FOREIGN PATENT DOCUMENTS

| | | |
|---|---|---|
| JP | 2002-85845 A | 3/2002 |
| JP | 2011-19817 A | 2/2011 |

OTHER PUBLICATIONS

International Search Report issued from PCT/JP2011/059083 mailed on Jul. 12, 2011 (2 pages).

* cited by examiner

*Primary Examiner* — Milap Shah
(74) *Attorney, Agent, or Firm* — Osha Liang LLP

(57) ABSTRACT

A program executed in a game device causes a controller to move a plurality of operated characters in a virtual three-dimensional space in accordance with operation signals; decide a moving direction of a field-of-view range; set a screen end of a display screen of a game image on the opposite side of the moving direction of the field-of-view range; generate, if a first operated character is located at a predetermined point outside the screen end, an operation event for receiving a specific operation from an operation unit operating the first operated character; and move, if the specific operation is received when the operation event is generated, at least a second operated character in the plurality of operated characters toward a position of the first operated character. The second operated character is closest to a screen end of the game image in the moving direction of the field-of-view range.

8 Claims, 23 Drawing Sheets

PROGRAM, GAME DEVICE AND METHOD OF CONTROLLING THE SAME

BACKGROUND OF INVENTION

1. Technical Field

One or more embodiments of the present invention relate to a program, a game device, and a method of controlling the same.

2. Background Art

Game devices which allow a plurality of players to play a game at the same time have become widely known. For example, there is a multiplayer action game in which each player operates his/her own operation means, aiming at conquering prepared stages.

In such a multiplayer action game, if there is a great difference in game skill between the players, due to the difference in the speed of progress between the respective players, the distance between characters operated by the respective players may become large in a virtual space. In such a case, it becomes difficult to display all the characters in one display screen at the same time. Thus, in such action games, the distance between a preceding character and a subsequent character has been processed so as not to be spaced farther apart than a predetermined distance in order to display both the characters in the same display screen.

One example of such action games is a game in which a character is controlled so as not to move out of a region in a display screen from an edge of the display screen on the opposite side of a direction of progress of the character. In such a game, even if a subsequent character falls behind a preceding character, the subsequent character moves in such a way that it is pushed by the edge of the display screen. Thus, the distance between the preceding character and the subsequent character will not become larger than the width of the display screen and the game can proceed with the preceding character and the subsequent character displayed in one display screen at the same time.

Another example of such games is disclosed in patent document 1 below. Patent document 1 discloses a game system which achieves an action game in which characters having a preset master-and-subordinate relationship are played by different players, respectively. In the game system according to patent document 1, if a situation arises where the subordinate character is scrolled out of a display screen or the master character and the subordinate character are spaced farther apart than a predetermined distance, the subordinate character is brought to a "ghost state" where the subordinate character, even if hit by other objects such as an enemy character or an obstacle in the display screen, can avoid disappearing due to the hits and the subordinate character is forcibly moved to the position where the master character exists.

PRIOR ART DOCUMENTS

Patent Document 1: JP2002-085845 A

SUMMARY OF THE INVENTION

However, in the game which allows the subsequent character to be controlled so as to be pushed by the edge of the display screen and thus moved, for example, since the subsequent character is highly likely to be operated by a less skilled player and thus it is possible that the subsequent character is pushed by the edge of the display screen during an action such as jumping, the difficulty in operation of the subsequent character is further increased. Accordingly, the less skilled player can no longer keep up with a high level of operation and the player cannot enjoy the game in many cases.

In addition, in a game as discussed above, when the character is sandwiched between the edge of the display screen and an object such as a wall, its player is typically treated as making an operation mistake. Thus, the less skilled player often suffers disadvantages and the difficulty in operation of the subsequent character further increases.

In the game using the game system disclosed in patent document 1, the subordinate character is, for example, forcibly moved to the position where the master character exists when being scrolled out from the display screen and thus the operation of the player operating the subordinate character does not affect the game progress a great deal. Thus, the player operating the subordinate character has difficulty finding a sense of participation in the game.

As described above, when there is a large difference in the game skill between the players in a multiplayer action game, a less skilled player might not enjoy the game sufficiently, since the less skilled player cannot keep up with the operation of a skilled player. On the other hand, the skilled player has to operate the movement of his/her own character while constantly checking the progress of the less skilled player and it cannot be said that an enjoyable game system has been provided.

One or more embodiments of the present invention provides a game program which enables, in a game device which can be played by a plurality of players, both a skilled player and a less skilled player to sufficiently enjoy a game even if there is a difference between the skills of the players, as well as the game device and a method of controlling the same.

An aspect of one or more embodiments of the present invention provides a program executed in a game device comprising: a plurality of operation means which receives operations from a plurality of players and outputs operation signals; a control means which arranges a viewpoint and a plurality of operated characters operated by the plurality of operation means in a virtual three-dimensional space; and a rendering means which projects the operated characters present in a field-of-view range from the viewpoint to a two-dimensional plane to create a game image, the program causing the control means to execute: a first step of moving the plurality of operated characters in the virtual three-dimensional space in accordance with the operation signals transmitted from the plurality of operation means; a second step of deciding a moving direction of the field-of-view range; a third step of setting a screen end of a display screen of the game image on an opposite side of the moving direction of the field-of-view range; a fourth step of generating, if a first operated character, which is at least one operated character in the plurality of operated characters, is located at a predetermined point outside the screen end, an operation event for receiving a specific operation from an operation means operating the first operated character; and a fifth step of moving, if the specific operation is received when the operation event is generated, at least a second operated character in the plurality of operated characters toward a position of the first operated character, the second operated character being an operated character closest to a screen end of the game image in the moving direction of the field-of-view range.

Another aspect of one or more embodiments of the present invention provides a game device comprising: a plurality of operation means which receives operations from a plurality of players and outputs operation signals; a control means which arranges a viewpoint and a plurality of operated characters operated by the plurality of operation means in a virtual three-dimensional space; and a rendering means which projects the operated characters present in a field-of-view range from the viewpoint to a two-dimensional plane to create a game image, wherein the control means includes: a moving means which moves the plurality of operated characters in the virtual three-dimensional space in accordance with the operation signals output from the plurality of operation means; a moving direction deciding means which decides a moving direction of the field-of-view range; a screen end setting means which sets a screen end of a display screen of the game image on the opposite side of the moving direction of the field-of-view range; an operation event generating means which generates, if a first operated character, which is at least one operated character in the plurality of operated characters, is located at a predetermined point outside the screen end, an operation event for receiving a specific operation from an operation means operating the first operated character; and a second operated character moving means which moves, if the specific operation is received when the operation event is generated, at least a second operated character in the plurality of operated characters toward a position of the first operated character, the second operated character being an operated character closest to a screen end of the game image in the moving direction.

Further aspect of one or more embodiments of the present invention provides a method of controlling a game device comprising: a plurality of operation means which receives operations from a plurality of players and outputs operation signals; a control means which arranges a viewpoint and a plurality of operated characters operated by the plurality of operation means in a virtual three-dimensional space; and a rendering means which projects the operated characters present in a field-of-view range from the viewpoint to a two-dimensional plane to create a game image, the control means comprising: a first step of moving the plurality of operated characters in the virtual three-dimensional space in accordance with the operation signals output from the plurality of operation means; a second step of deciding a moving direction of the field-of-view range; a third step of setting a screen end of a display screen of the game image on the opposite side of the moving direction of the field-of-view range; a fourth step of generating, if a first operated character, which is at least one operated character in the plurality of operated characters, is located at a predetermined point outside the screen end, an operation event for receiving a specific operation from an operation means operating the first operated character; and a fifth step of moving, if the specific operation is received when the operation event is generated, at least a second operated character in the plurality of operated characters toward a position of the first operated character, the second operated character being an operated character closest to a screen end of the game image in the moving direction.

Accordingly, even in the situation in which the first operated character, being at least one of the plurality of characters, is located at the point outside the screen end of the game image on the opposite side of the moving direction of the field-of-view range, the control means can generate the operation event for receiving the specific operation from the operation means operating the first operated character, and move, if the specific operation is received from the operation means operating the first operated character, at least the second operated character, which is the operated character closest to the screen end of the game image in the moving direction, toward the position of the first operated character. With such a configuration, it is possible to avoid the character from disappearing easily when the character is located at a predetermined point outside the screen end of the game image on the opposite side of the moving direction of the field-of-view range.

One or more embodiments of the present invention can achieve, even if players with different skills play a game in a game device which can be played by a plurality of players, a game program which enables both a skilled player and a less skilled player to sufficiently enjoy a game, as well as the game device and a method of controlling the same.

DETAILED DESCRIPTION

One or more embodiments of the present invention will be described in detail below with reference to the attached drawings. It should be noted that the embodiments do not limit the scope of the present invention.

External Configuration of Game Device

Figure 1:
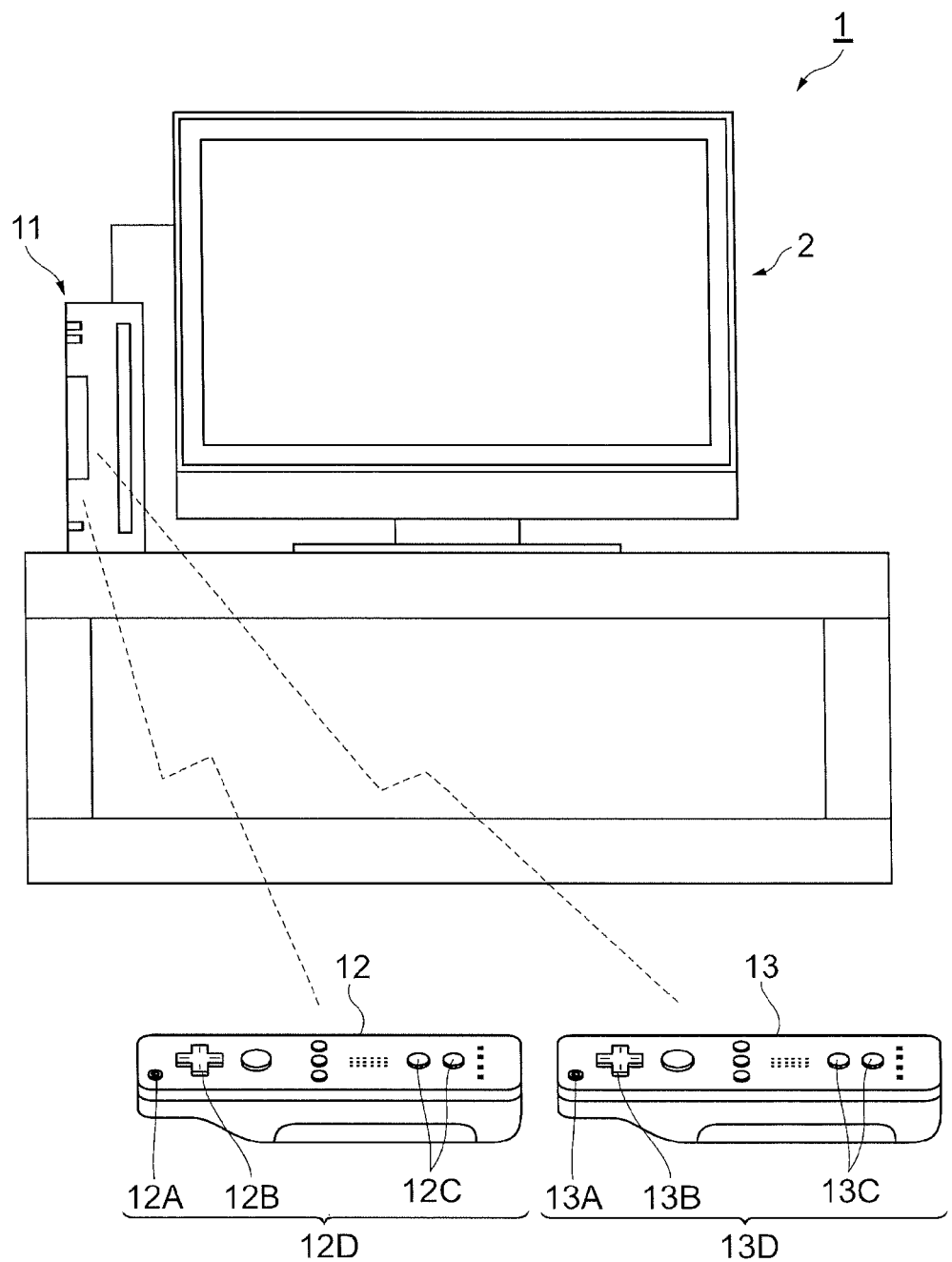
FIG. 1 is an example block diagram showing an external configuration of a game device in accordance with one or more embodiments of the present invention.

FIG. 1 shows an example of an external configuration of a game device 1 according to one or more embodiments of the present invention. The game device 1 is connected to, for example, a television monitor (display means) 2 seated on a television table in use. The game device 1 includes a game device body 11, a first controller 12 (operation means) operated by a first player and a second controller 13 (operation means) operated by a second player. The television monitor 2 is a CRT, a liquid crystal display device or the like.

The game device body 11 is connected to the television monitor 2 via, for example, a predetermined cable. The game device body 11 is capable of communicating via radio waves with the first controller 12 and the second controller 13.

The first controller 12 and the second controller 13 are operated by the respective players. The first controller 12 has an operation surface provided with various types of operation buttons 12D such as, for example, a power button 12A, a cross-shaped button 12B and operation buttons 12C (see FIG. 2). The second controller 13 has an operation surface provided with various types of operation buttons 13D such as, for example, a power button 13A, a cross-shaped button 13B and operation buttons 13C (see FIG. 2). The first player and the second player can interactively play a game using the first controller 12 and the second controller 13, respectively, while seeing the television monitor 2.

Note that there may be, for example, three or more controllers so that three or more players can play a game using the respective controllers.

Internal Configuration of Game Device

Figure 2:
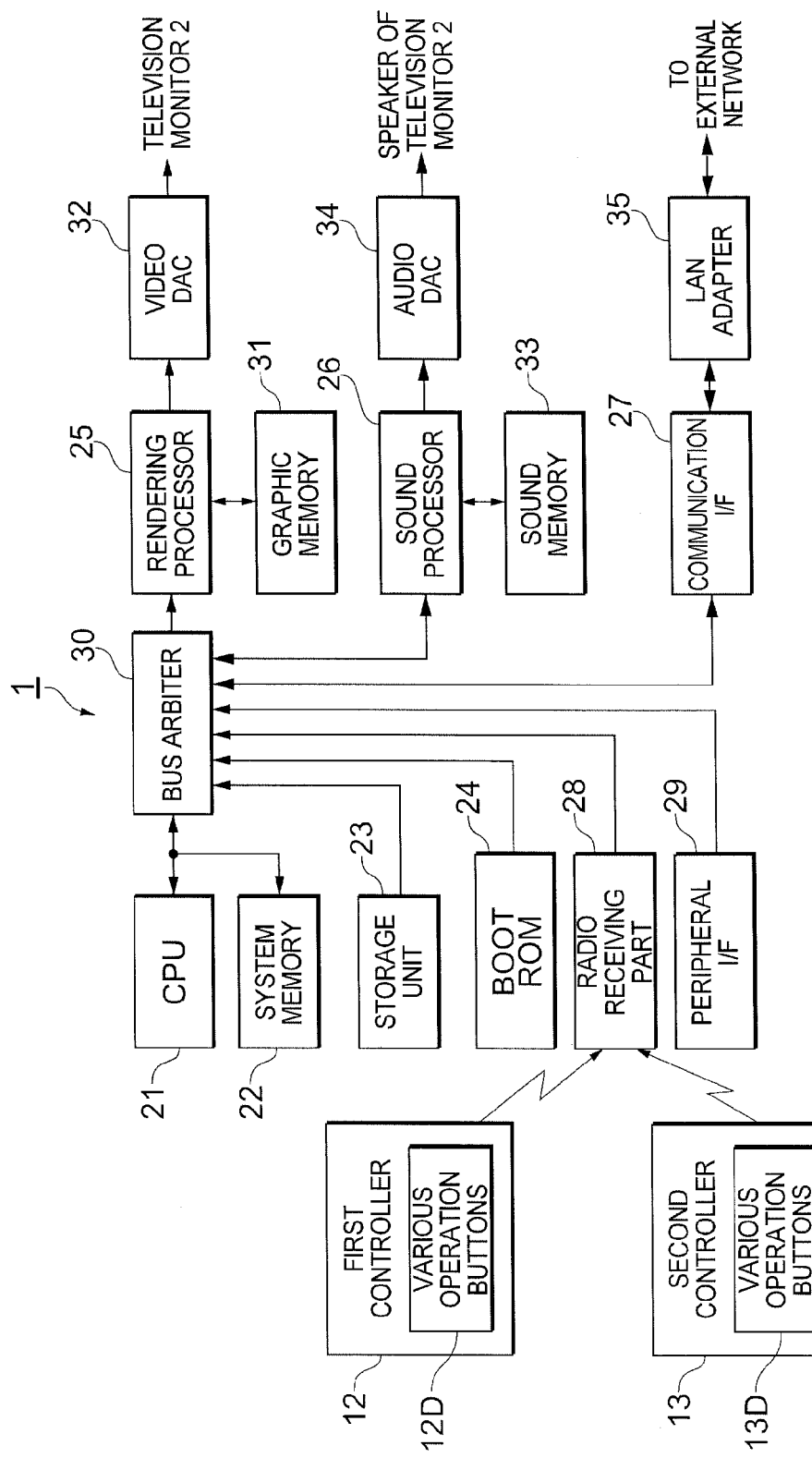
FIG. 2 is an example block diagram shown an internal configuration of the game device in accordance with one or more embodiments of the present invention.

An example of an internal configuration of the game device 1 will be described below. FIG. 2 is a block diagram showing the internal configuration of the game device 1 according to one or more embodiments of the present invention.

The game device 1 includes, for example, a CPU 21 (control means), a system memory (RAM) 22, a storage unit 23, a BOOTROM 24, a rendering processor 25 (rendering means), a sound processor 26, a communication interface (communication I/F) 27, a wireless receiving part 28 and a peripheral interface (peripheral I/F) 29, which are connected to a bus arbiter 30 via, for example, bus lines. The bus arbiter 30 controls flows of programs and data between each block in the game device 1 and external devices connected to the game device 1. The game device 1 may include a geometry processor (not shown).

The CPU 21 executes a game program to comprehensively control the game device, perform coordinate calculation for displaying images, and so on. The CPU 21 controls, for example, characters appearing in the game based on operation signals (described later) transmitted from the first controller 12 and the second controller 13. The system memory 22 function as a buffer memory which stores, for example, a program and data required for the CPU 21 to perform processing. The CPU 21 and the system memory 22 are connected to each other via a bus line.

The storage unit 23 is, for example, a program data storage device or a storage medium (including an optical disc and an optical disc drive for driving a game recording medium (e.g., a CO-ROM)) which stores a game program and data (including video data and music data). The BOOTROM 24 stores a program and data for booting the game device 1.

The game device 1 stores, in the system memory 22, polygon data (vertex data) having three-dimensional local coordinate data constituting objects to be displayed and NURBS (Non Uniform Rational B-Spline) data (curved surface data and control point data) in order to generate a display image and the CPU 21 and the geometry processor (not shown) arrange the objects in a world coordinate system in a three-dimensional virtual space and convert local coordinates to world coordinates.

Next, in the game device 1, the CPU 21 and the geometry processor (not shown) set viewpoint coordinates generated in accordance with players' operations and game progress in the world coordinates, convert an object present in a field-of-view range as viewed from the viewpoint in a predetermined direction and at a predetermined angle of view into a viewpoint coordinate system originating from the viewpoint coordinates and transmits the coordinates of the converted object to the rendering processor 25.

The rendering processor 25 is connected to a graphic memory 31 and a video DAC 32. The video DAC 32 is connected to the television monitor 2. The rendering processor 25 generates an image for display in accordance with the players' operations and game progress based on video (movie) data read from the storage unit 23 via the bus arbiter 30 and transmits the generated image to the video DAC 32. In this case, more specifically, the rendering processor 25 performs, at first, interpolation processing such as light source processing for the coordinates of the object transmitted from the CPU 21 and processing for providing details on the surface of the object by attaching texture data stored in the graphic memory 31 to the object. The rendering processor 25 projects the object (polygon) from the three-dimensional stereoscopic object to a two-dimensional plane (screen) for displaying the object on the television monitor 2, converts the object to the two-dimensional coordinate data (a screen coordinate system), generates a two-dimensional image by displaying polygons from the polygon at the shallowest depth in the Z coordinate, i.e., the polygon closest to the viewpoint coordinates, with the highest priority, and transmits the two-dimensional image to the video DAC 32.

The graphic memory 31 stores graphic data, etc. required for the rendering processor 25 to generate images. The video DAC 32 converts a digital image signal transmitted from the rendering processor 25 to an analog signal and transmits the converted signal to the television monitor 2. The television monitor 2 displays an image based on the analog image signal.

The sound processor 26 is connected to a sound memory 33 and an audio DAC 34. The audio DAC 34 is connected to a speaker of the television monitor 2. The sound processor 26 generates sound effects and voices in accordance with the players' operations and the game progress based on sound data read from the storage unit 23 via the bus arbiter 30 and transmits such sounds to the audio DAC 34. The sound memory 33 stores sound data, etc. required for the sound processor 26 to generate the sound effects and sounds. The audio DAC 34 converts a digital sound signal output from the sound processor 26 to an analog signal and transmits the converted signal to the television monitor 2. The speaker of the television monitor 2 outputs sounds based on the analog sound signal.

The communication interface 27 is connected to the external network via a LAN adapter 35. In other words, the game device body 11 is connected to the Internet and thus capable of communicating with other game devices, network servers and the like.

The communication interface 27 and the LAN adapter 35 may be replaced with other communication devices such as, for example, a terminal adapter (TA) and a router using a telephone line, a cable modem using a cable television line, a radio communication device using a mobile phone and PHS, and an optical fiber communication device using an optical fiber.

The radio receiving part 28 communicates via radio waves with the first controller 12 and the second controller 13. The first controller 12 and the second controller 13 receive operations from the respective players, generate operation signals and transmit the operation signals to the radio receiving part 28. The radio receiving part 28 receives the operation signal transmitted from the first controller 12 and the operation signal transmitted from the second controller 13. The peripheral interface 29 allows connections with various types of peripheral devices.

Note that the game device 1 is not limited to a home-use game device but may be an information processing device which serves as a game device having a similar system configuration, such as a personal computer, a portable electronic game machine, an electronic device such as a mobile phone and a PDA, an arcade game device installed in an amusement park or a store such as a game café.

Outline of Function of Preventing Character's Disappearance Caused by Obstacle and Screen End The following description will explain the outline of a function of preventing a character's disappearance caused by an obstacle and a screen end according to one or more embodiments of the present invention. The game device 1 displays on the television monitor 2 an action game, which can be played at the same time by a plurality of players aiming at conquering prepared stages, and controls this action game. Note that the character's disappearance herein refers to a state in which a player's operation is treated as a mistake in this action game, resulting in, for example, a reduction in the number of remaining characters played by the player.

The function of preventing the character's disappearance caused by an obstacle and a screen end is, in an action game which is reproduced by the CPU 21 of the game apparatus 1 executing a game program stored in the storage unit 23, a function achieved based on the game program under the control of the CPU 21.

FIGS. 3-10 are conceptual diagrams provided for explaining the function of preventing character's disappearance caused by an obstacle and a screen end, and specifically showing an example of a game image including a plurality of characters displayed in a display screen of a single television monitor 2.

Figure 3:
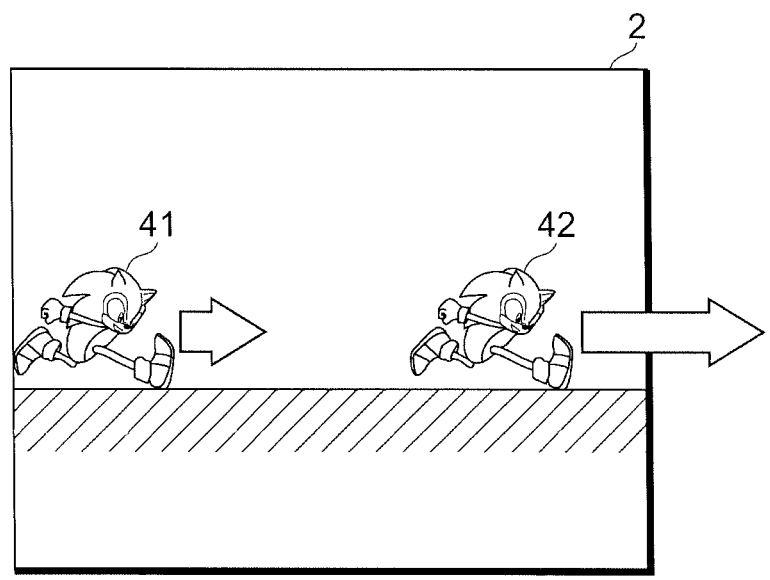
FIG. 3 is an example conceptual diagram provided for explaining the outline of a function of preventing a character's disappearance in accordance with one or more embodiments of the present invention.

The display screen on the television monitor 2 displays, for example, a game image including a first character 41 operated by a first player using the first controller 12 and a second character 42 operated by a second player using the second controller 13 as shown in FIG. 3. The first character 41 and the second character 42 move, for example, rightward in the display screen on the television monitor 2. In other words, the game image displayed in the display screen on the television monitor 2 is scrolled leftward in accordance with moving commands issued by the first player and the second player to the first character 41 and the second character 42, whereby the game image is provided as if the first character 41 and the second character moved rightward in a virtual space. The moving direction of the first character 41 and the second character 42 is set, if, for example, a path containing travelling direction information is set in a game stage, based on the travelling direction information contained in the path. Further, if a destination is set in a game stage, a direction toward the destination is set as the travelling direction of the first character 41 and the second character 42. Furthermore, if the game image is generated such that a predetermined character is constantly positioned around the center of the television monitor 2, the direction in which this character moves is set as the travelling direction.

If there is a difference in the game skills of the first player and the second player in such an action game, the progress of the first character 41 and the progress of the second character 42 will differ from each other and a distance between the first character 41 and the second character 42 will thus become large.

Figure 4:
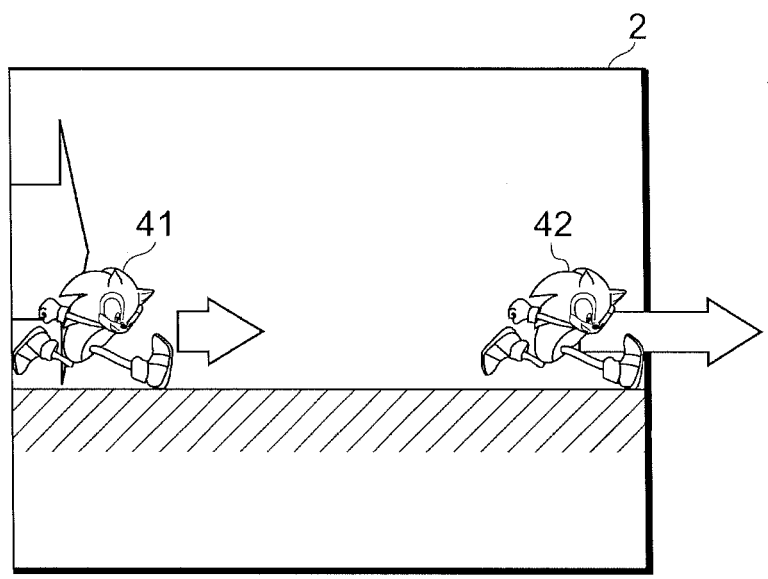
FIG. 4 is an example conceptual diagram provided for explaining the outline of the function of preventing a character's disappearance in accordance with one or more embodiments of the present invention.

Even if the distance between the first character 41 and the second character 42 becomes large, the first character 41 and the second character 42 have to be displayed in the display screen on the television monitor 2. Thus, if, for example, the preceding second character 42 further moves forward, processing (drag processing) is performed such that the subsequent first character 41 is dragged by a screen end on the opposite side of the screen end in the moving direction to thereby prevent the subsequent first character 41 from crossing over the screen end on the opposite side of the screen end in the moving direction and thus disappearing from the display screen, as shown in FIG. 4. In short, the drag processing is, for example, processing for dragging a subsequent character by the screen end on the opposite side of the screen end in the moving direction in accordance with the movement of the preceding character.

Figure 5:
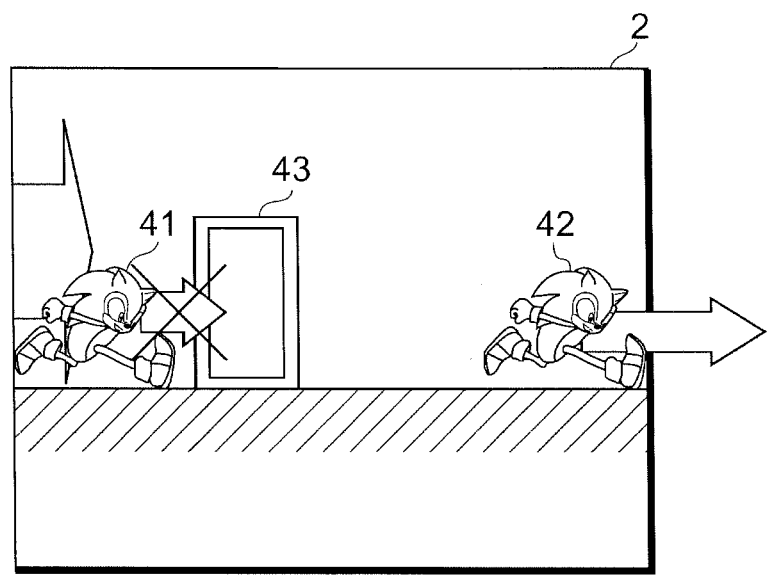
FIG. 5 is an example conceptual diagram provided for explaining the outline of the function of preventing a character's disappearance in accordance with one or more embodiments of the present invention.

However, in a situation where there is an obstacle 43 ahead of the first character 41, even if the subsequent first character 41 is dragged by the screen end on the opposite side of the moving direction, the first character 41 will be blocked by the obstacle 43 as shown in FIG. 5.

Figure 6:
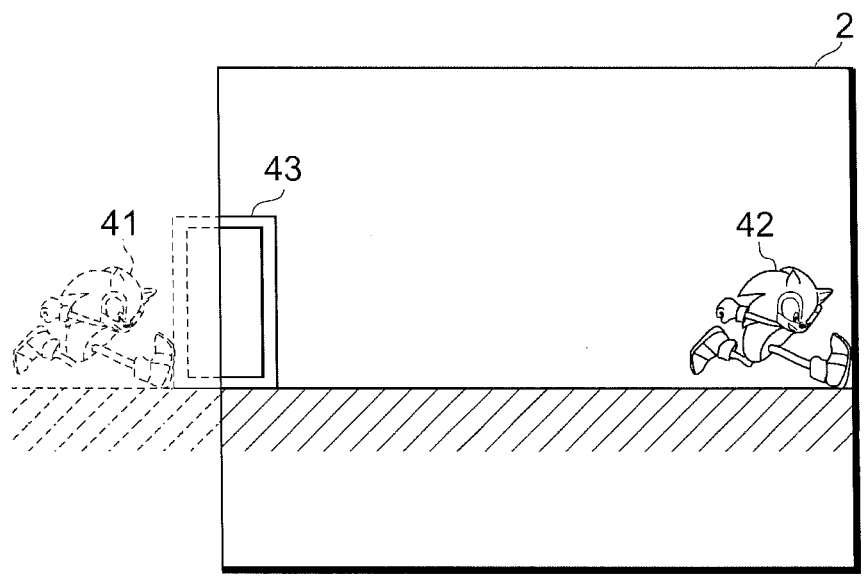
FIG. 6 is an example conceptual diagram provided for explaining the outline of the function of preventing a character's disappearance in accordance with one or more embodiments of the present invention.
Figure 7:
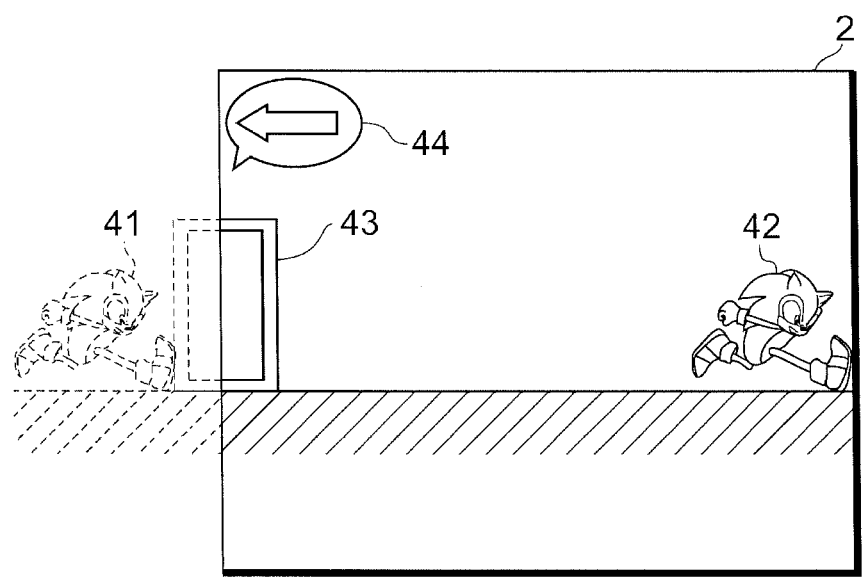
FIG. 7 is an example conceptual diagram provided for explaining the outline of the function of preventing a character's disappearance in accordance with one or more embodiments of the present invention.

In this case, since the subsequent first character 41 will cross over the screen end on the opposite side of the screen end in the moving direction and disappear as the game progresses as shown in FIG. 6, the first player will not be able to watch the first character 41 to operate it. In this situation, if, for example, the subsequent first character 41 moves out of the display screen and reaches a point shown in FIG. 7, an operation icon 44 is displayed for prompting an operation of the first player who operates the subsequent first character 41 as shown in FIG. 7. For example, the operation icon 44 is an icon requesting the input of an operation in the reverse direction of the moving direction of the first character 41 and the second character 42. Alternatively, the operation icon 44 may also be an icon requesting the input of an operation in a direction preset for each display screen when a determination is made as to in which direction the subsequent first character 41 has moved out of the display screen and reached a predetermined point.

Figure 8:
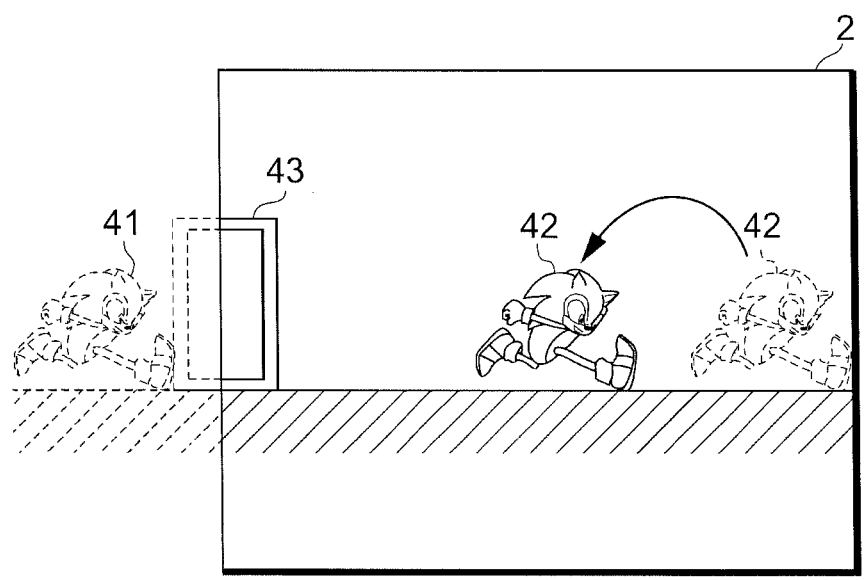
FIG. 8 is an example conceptual diagram provided for explaining the outline of the function of preventing a character's disappearance in accordance with one or more embodiments of the present invention.
Figure 9:
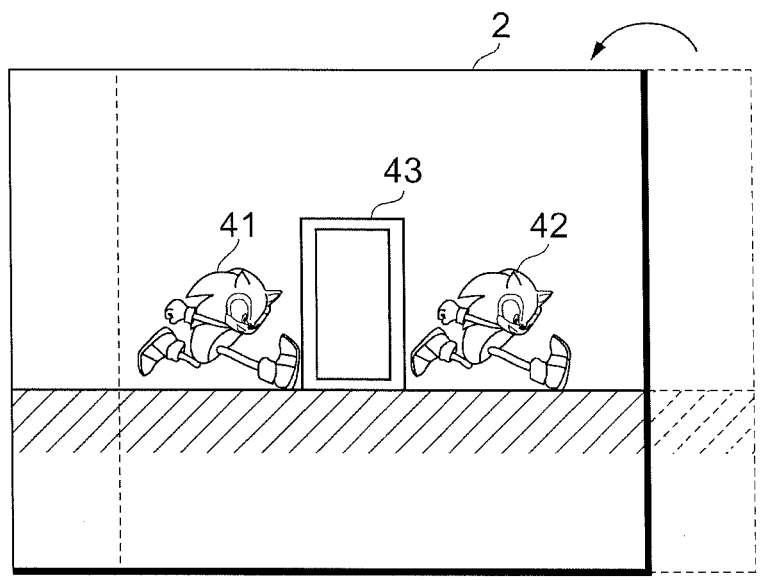
FIG. 9 is an example conceptual diagram provided for explaining the outline of the function of preventing a character's disappearance in accordance with one or more embodiments of the present invention.

When the operation requested by the operation icon 44 is input by the first player within a predetermined time period, the operation of the second character 42 by the second player is temporarily disabled and the preceding second character 42 is forcibly moved toward the subsequent first character 41 independently of the operation input by the second player as shown in FIG. 8. In addition, in response to the forcible movement of the preceding second character 42 toward the subsequent first character 41, the game image displayed in the display screen on the television monitor 2 is also moved reversely to the moving direction as shown in FIG. 9. Then, the operation of the second character 42 by the second player is enabled again.

Figure 10:
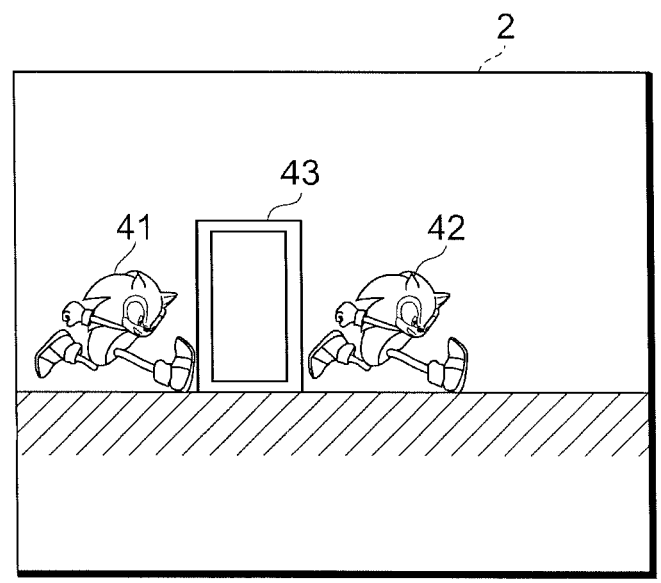
FIG. 10 is an example conceptual diagram provided for explaining the outline of the function of preventing a character's disappearance in accordance with one or more embodiments of the present invention.

As a result of such processing, the action game is continued in a state in which the distance of the first character 41 and the second character 42 is reduced as shown in FIG. 10.

On the other hand, if the operation requested by the operation icon 44 is not input within the predetermined time period or there is a failure to input the requested operation, processing for causing the subsequent first character 41 to disappear is performed. Specifically, a game image is provided such that the first character 41 is sandwiched between the obstacle 43 and the screen end on the opposite side of the moving direction and, so to say, crushed to death. Then, if there is still a remaining number of characters that the first player can play, processing for starting a new game is performed.

As described above, even in the situation where the subsequent first character 41 moves out of the display screen and reaches a predetermined point, the operation requested by the operation icon 44 is input by the first player within the predetermined time period to forcibly move the preceding second character 42 toward the subsequent first character 41, whereby the player is provided with a chance for avoiding the subsequent first character 41 from being sandwiched by the obstacle 43 and the screen end on the opposite side of the moving direction and thus disappearing (being crushed to death), and thus it is possible to prevent the subsequent first character 41 played by the less-skilled player from disappearing easily.

Outline of Function of Limiting Character's Moving Speed

Next, the outline of a function of limiting a character's moving speed in accordance with one or more embodiments of the present invention will be described.

The function of limiting the character's moving speed in one or more embodiments of the present invention is, in the above-described action game which is reproduced by the CPU 21 of the game device 1 executing a game program stored in the storage unit 23, a function achieved based on the game program under the control of the CPU 21, in the same way as the above-described function of preventing character's disappearance caused by the obstacle and the screen end.

FIGS. 11-14 are conceptual diagrams provided for explaining the function of limiting a character's moving speed in accordance with one or more embodiments of the present invention, each specifically showing an example of a game image displayed in the display screen on the television monitor 2.

Figure 11:
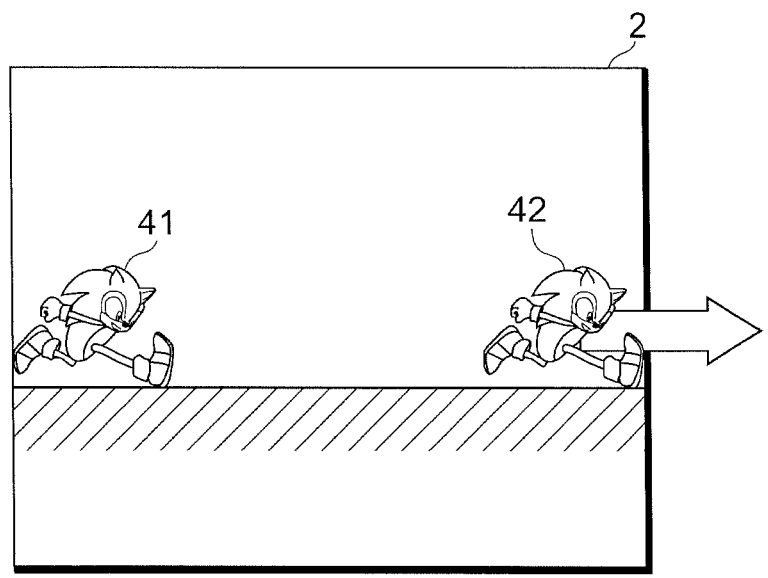
FIG. 11 is an example conceptual diagram provided for explaining the outline of a function of limiting a character's moving speed in accordance with one or more embodiments of the present invention.

As shown in FIG. 11, the display screen on the television monitor 2 displays, for example, a game image including the first character 41 and the second character 42 as in the case shown in FIG. 3, and the first character 41 and the second character 42 move rightward in the display screen on the television monitor 2. In a normal mode in such an action game, as the distance between the first character 41 and the second character 42 increases, the game image displayed in the display screen on the television monitor 2 is scrolled at the same speed as the speed of the preceding second character 42.

Figure 12:
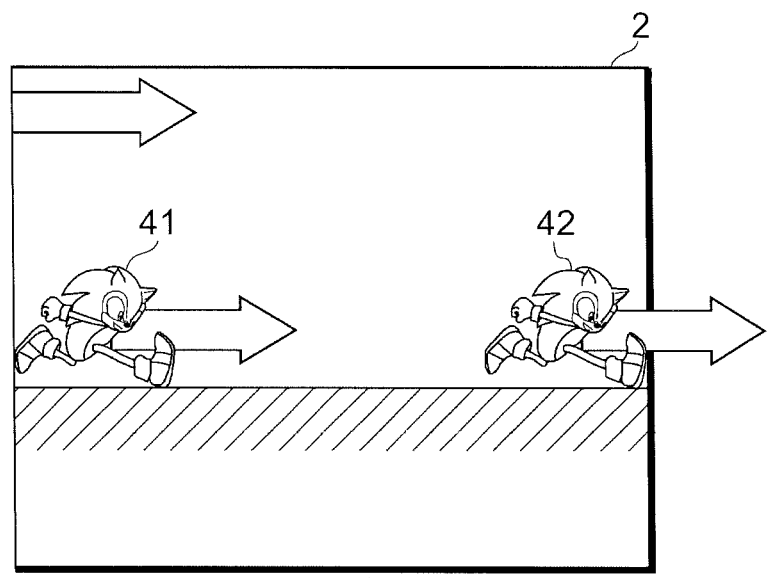
FIG. 12 is an example conceptual diagram provided for explaining the outline of the function of limiting a character's moving speed in accordance with one or more embodiments of the present invention.
Figure 13:
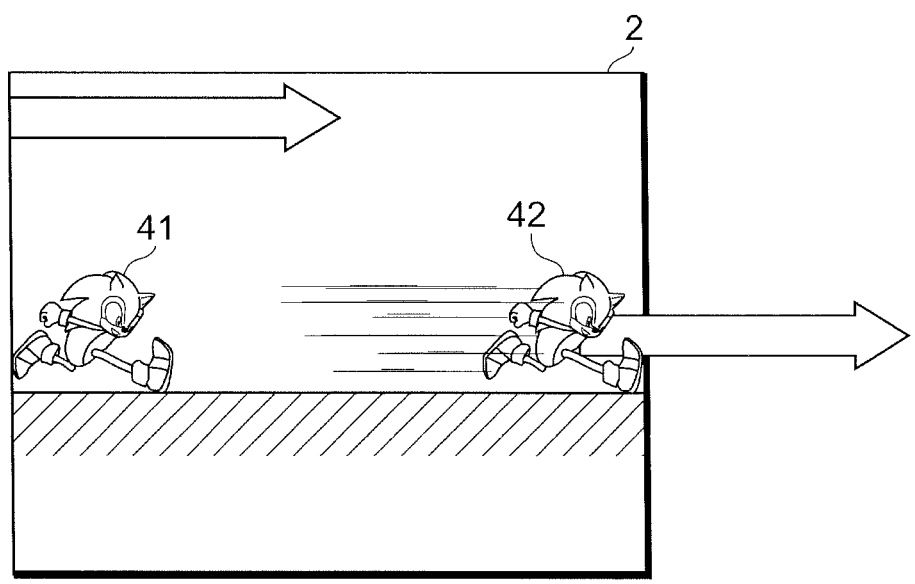
FIG. 13 is an example conceptual diagram provided for explaining the outline of the function of limiting a character's moving speed in accordance with one or more embodiments of the present invention.

In this case, even if the first character 41 stops at a position, it is dragged by the screen end on the opposite side of the moving direction in accordance with the scroll of the game image on the television monitor 2 and forcibly moved at the same speed as the speed of the preceding second character 42 as shown in FIG. 12.

Figure 14:
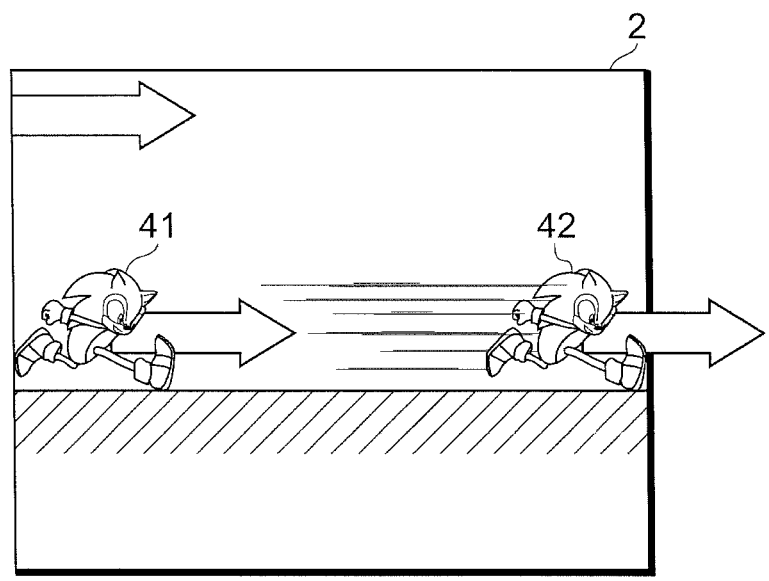
FIG. 14 is an example conceptual diagram provided for explaining the outline of the function of limiting a character's moving speed in accordance with one or more embodiments of the present invention.

When the preceding second character 42 is in a boost mode and the processing for dragging the subsequent first character 41 by the screen end on the opposite side of the moving direction is performed, for example, the speed of the preceding second character 42 is limited such that the second character 42 can move only at a speed of about one tenth of the speed in the ordinary boost mode as shown in FIG. 14. In the state where the speed of the second character is limited, the operation of the first character 41 is performed with a relatively large amount of leeway. By changing the mode of the first character to the boost mode in this state, the drag processing for the first character 41 is no longer performed and the speed limit for the preceding second character 42 is thus cancelled and an exhilarating play with a progress at a faster speed can be achieved. As described above, even if the mode of the preceding second character 42 is changed to the boost mode and its speed increases, the first player operating the subsequent first character 41 can operate its character with leeway. In addition, since it is possible to operate its character with leeway while the speed is being limited, it is possible to prompt the first player to change the mode of the subsequent first character 41 to the boost mode and thus it becomes easier to bring a plurality of characters to the boost mode at the same time.

View Frustum Set by CPU

Next, a view frustum set by the CPU 21 according to one or more embodiments of the present invention will be described. In the game device 1 according to one or more embodiments of the present invention, the CPU 21 arranges a viewpoint 45 at any given position in a virtual three-dimensional space and also sets a field-of-view range 46 (hereinafter referred to as the "view frustum") in the form of quadrangular truncated pyramid showing the virtual three-dimensional space as viewed from the viewpoint 45. The rendering processor 25 projects, by rendering, objects in the virtual three-dimensional space, such as characters and obstacles present in the view frustum 46 to a two-dimensional plane. The resulting image based on the two-dimensional plane is displayed as a game image in the display screen on the television monitor 2. In addition, the CPU 21 sets an internal view frustum 47 inside the view frustum 46, the internal view frustum 47 being in the form of quadrangular truncated pyramid and smaller than the view frustum 46.

Figure 15:
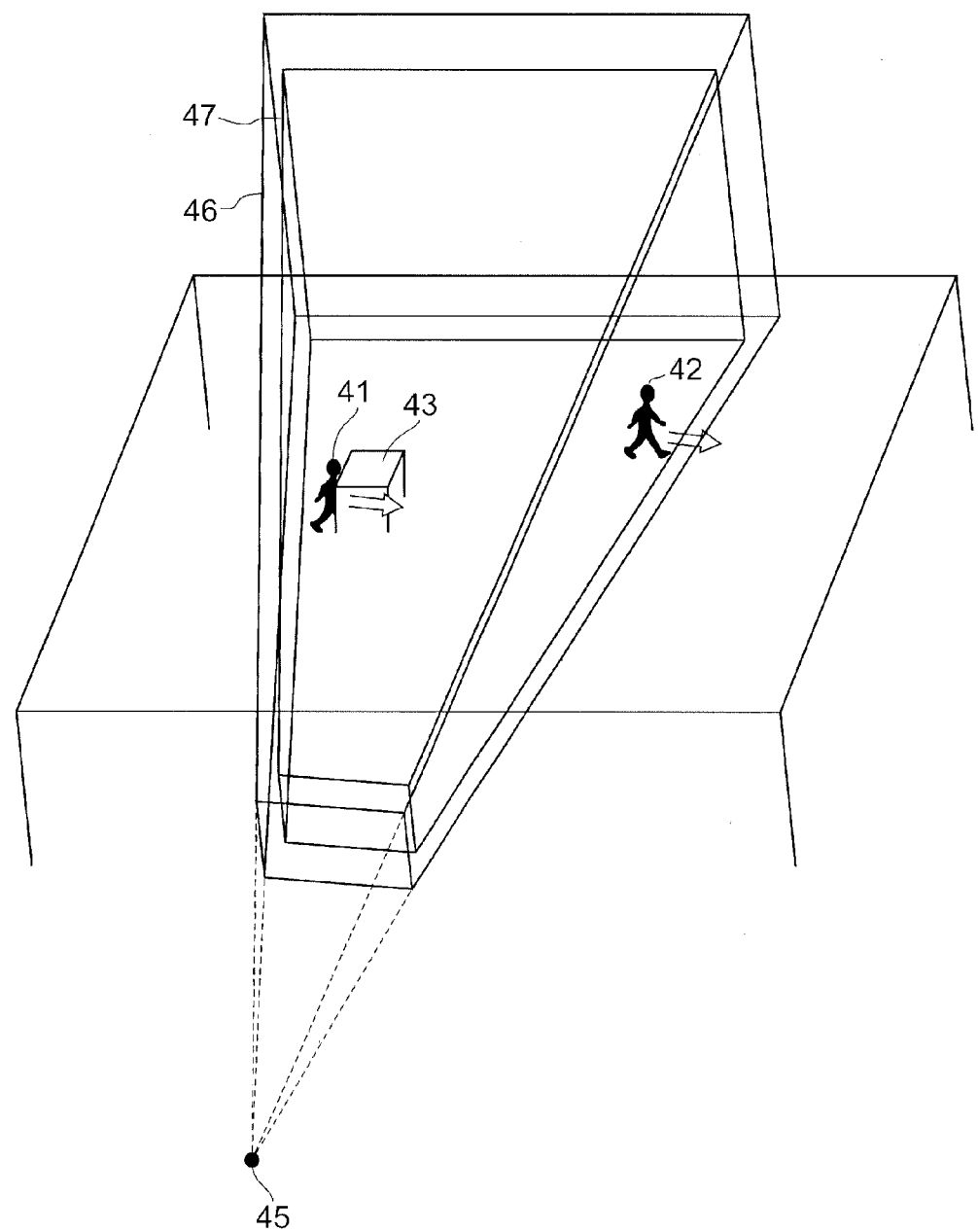
FIG. 15 is an example conceptual diagram provided for explaining a view frustum set by a CPU in accordance with one or more embodiments of the present invention.
Figure 16:
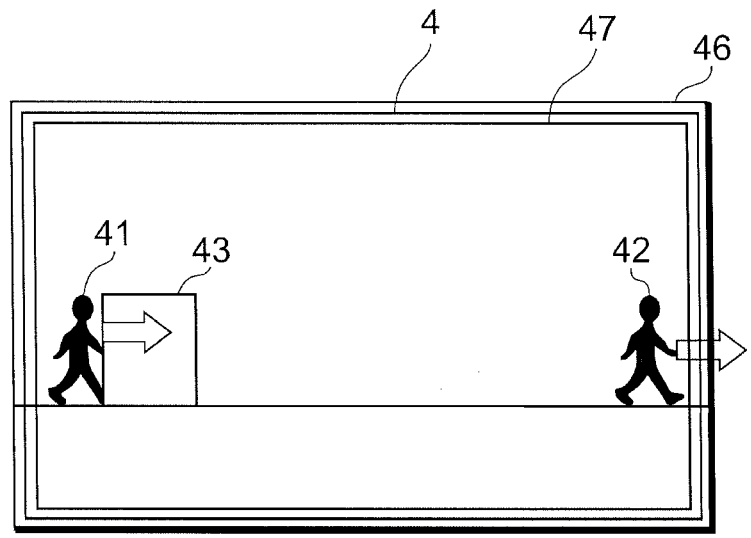
FIG. 16 is an example conceptual diagram provided for explaining the view frustum set by the CPU in accordance with one or more embodiments of the present invention.

FIG. 16 is a conceptual diagram provided for explaining the two-dimensional plane generated by the rendering processor 25. FIG. 16 is an illustration of a two-dimensional plane representing a virtual three-dimensional space as viewed from a viewpoint 45 arranged by the CPU 21 on a lateral side of the first character 41 and the second character 42 in the virtual three-dimensional space (see FIG. 15). In this case, the CPU 21 sets the two-dimensional plane of the view frustum 46 projected by the rendering processor 25 so as to be larger than a region actually displayed on a screen of the television monitor 2 (hereinafter referred to as the "display screen region 4"). Since it is assumed that display screen regions 4 slightly differ among various display devices such as televisions, the CPU 21 configures the display screen region 4 so as to be displayable in full measure even in such condition. Accordingly, the entire two-dimensional plane may not be displayed in the display screen region 4 of the television monitor 2 depending on the size of the display screen region 4 of each display device. In contrast, the CPU 21 sets the two-dimensional plane of the internal view frustum 47 projected by the rendering processor 25 so as to be smaller than the display screen region 4 of the television monitor 2. By setting the internal view frustum used in the drag processing so as to be smaller than the display screen region 4, the CPU 21 can display on the screen the state in which the first character 41 is dragged in accordance with the movement of the second character 41.

Figure 17:
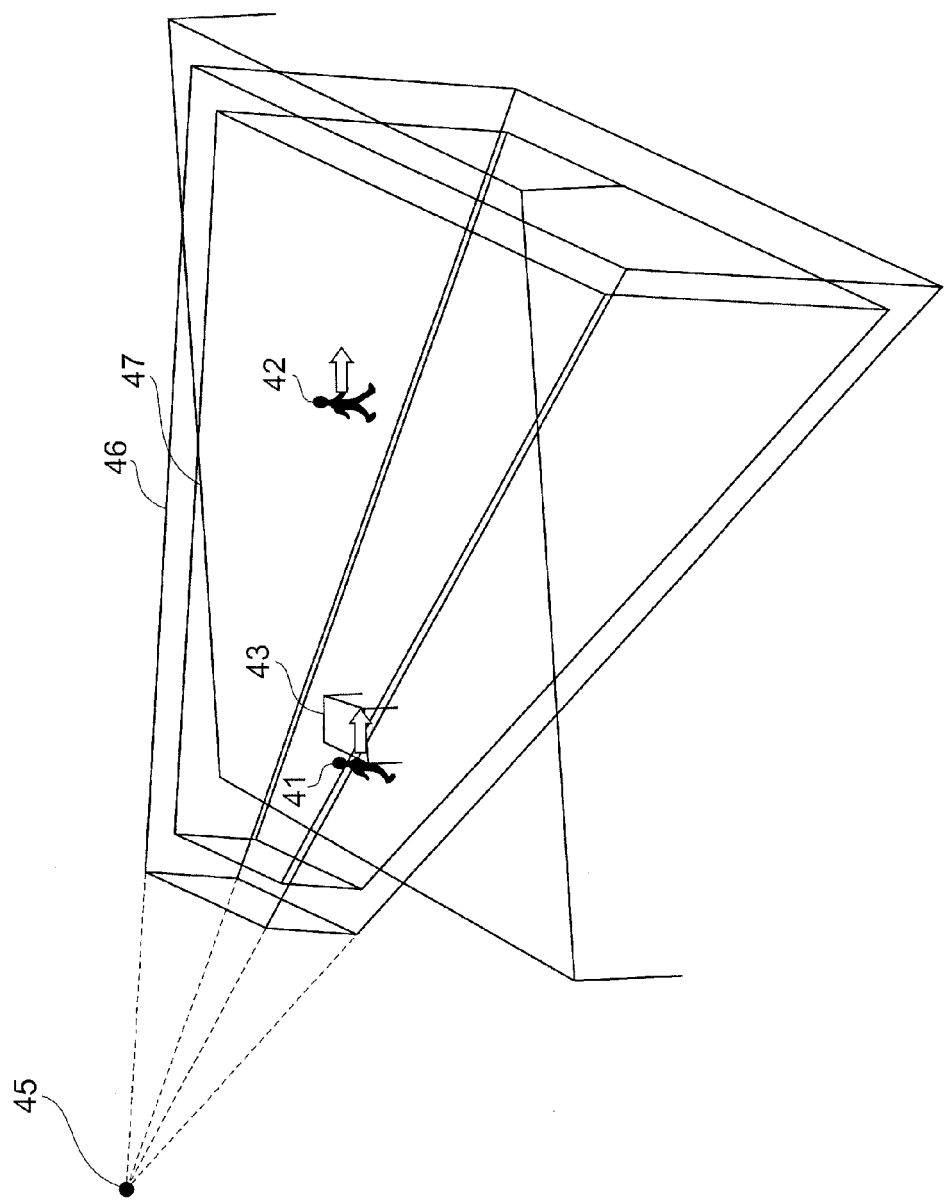
FIG. 17 is an example conceptual diagram provided for explaining the view frustum set by the CPU in accordance with one or more embodiments of the present invention.
Figure 18:
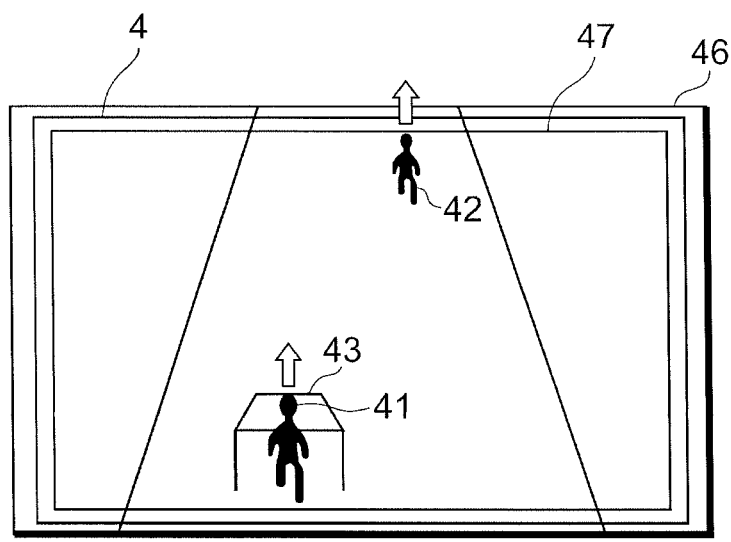
FIG. 18 is an example conceptual diagram provided for explaining the view frustum set by the CPU in accordance with one or more embodiments of the present invention.

FIG. 17 is a conceptual diagram showing the virtual three-dimensional space as viewed from a viewpoint 45 which is arranged by the CPU 21 on a rear side of the first character 41 and the second character 42 in the virtual three-dimensional space. In this case, as shown in FIG. 18, the CPU 21 sets the two-dimensional plane of the view frustum 46 so as to be larger than the display screen region 4 of the television monitor 2 and sets the two-dimensional plane of the internal view frustum 47 so as to be smaller than the display screen region 4 of the television monitor 21, in the same way as in the case shown in FIG. 16.

Drag Processing of a Character

Figure 19:
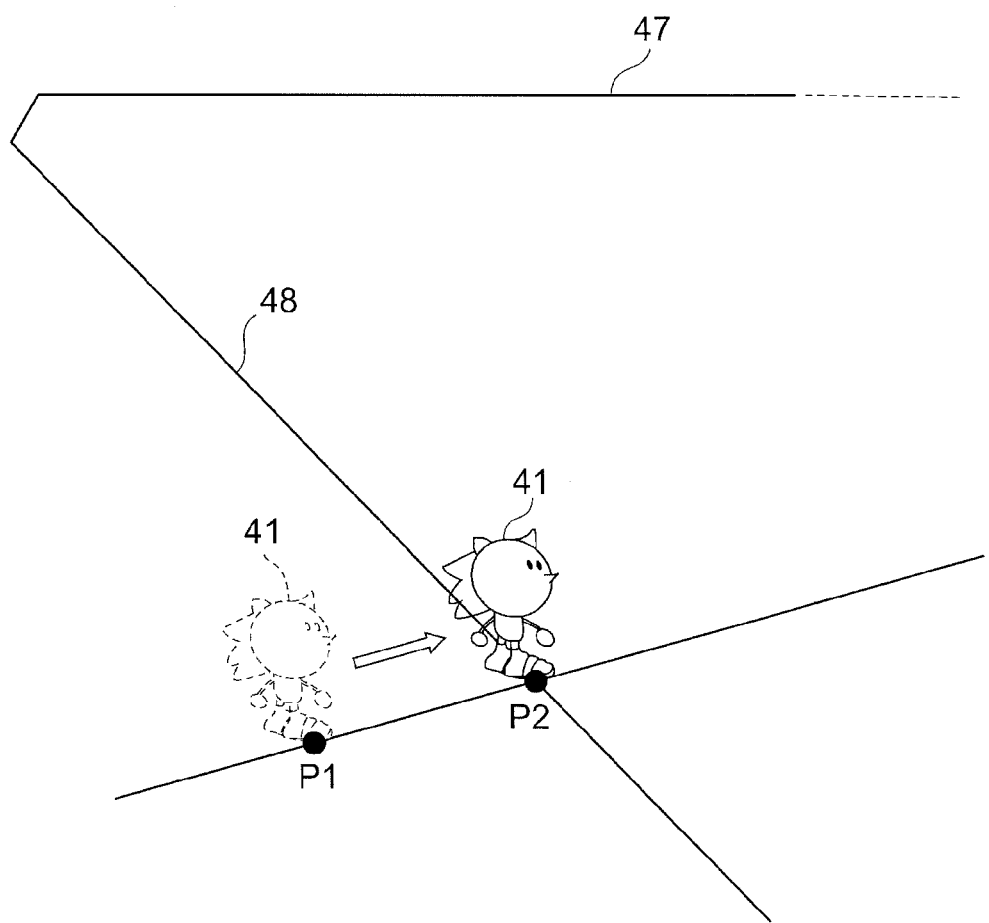
FIG. 19 is an example conceptual diagram provided for explaining drag processing of a character in accordance with one or more embodiments of the present invention.

Next, the drag processing of a character according to one or more embodiments of the present invention will be described. FIG. 19 is a conceptual diagram provided for explaining drag processing of a character. Specifically, FIG. 19 is a diagram showing the virtual three-dimensional space shown in FIG. 18 as viewed from the lateral side thereof for the convenience of explanation. In this case, the first character 41 moves rightward in FIG. 19.

In the game device 1 according to one or more embodiments of the present invention, the CPU 21 performs processing for dragging the subsequent first character 41 by the screen end on the opposite side of the screen end in the moving direction in accordance with the movement of the second character 41 in order to prevent the subsequent first character 41 from crossing over the screen end on the opposite side of the moving direction and thus disappearing.

Specifically, the CPU 21 uses the internal view frustum 47 for determination as to whether the subsequent first character 41 moves out of the display screen on the television monitor 2. More specifically, the CPU 21 determines as to whether or not the subsequent first character 41 has crossed over the closest determination plane 48 in the internal view frustum 47 toward the outside of the internal view frustum 47. When determining that the subsequent first character 41 has crossed over the determination plane 48 toward the outside of the internal view frustum 47, the CPU 21 moves the subsequent first character 41 to the determination plane 48. For example, if the subsequent first character 41 which stops has crossed over the closest determination plane 48 of the internal view frustum 47 and is at a position P1, the CPU 21 moves the subsequent first character 41, by taking the shortest way, to a position P2 on the line of intersection between the closest determination plane 48 of the internal view frustum 47 and the ground.

Figure 20:
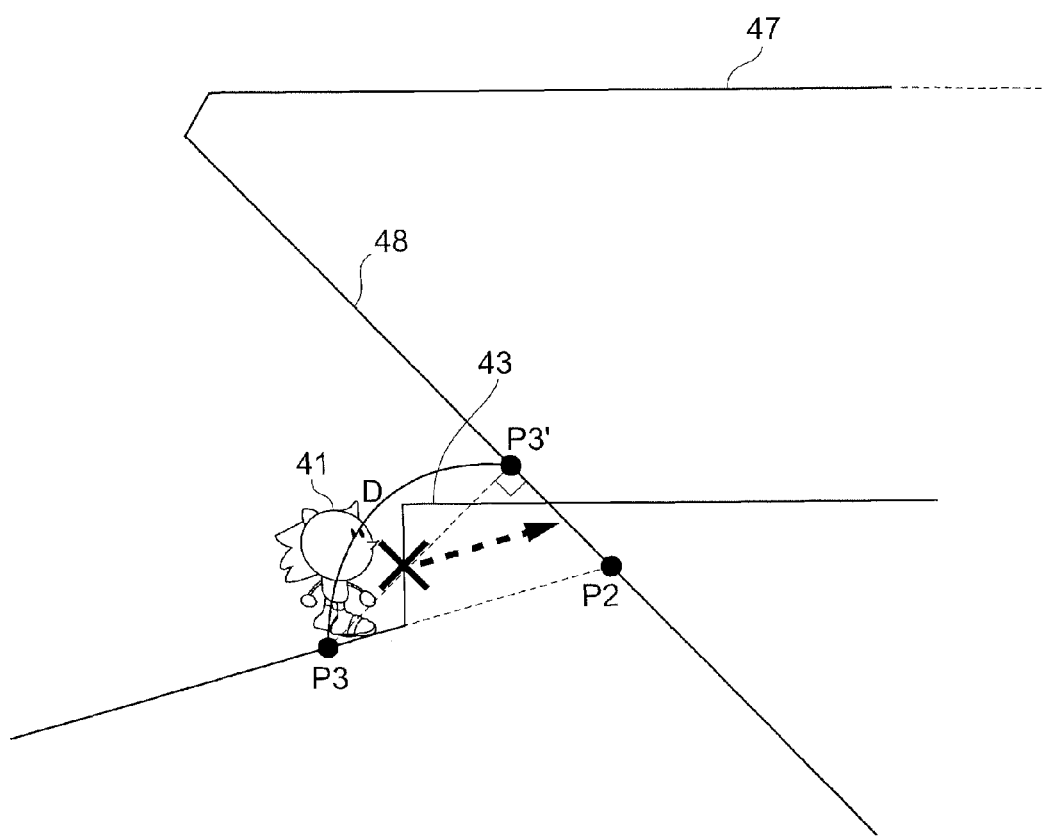
FIG. 20 is an example conceptual diagram provided for explaining a trigger for processing for preventing crushing death caused by an obstacle in accordance with one or more embodiments of the present invention.

Trigger for Processing for Preventing Character's Disappearance Caused by Obstacle and Screen End The following description will explain the trigger for the processing for preventing a character's disappearance caused by an obstacle and a screen end. FIG. 20 is a conceptual diagram provided for explaining the trigger for the processing for preventing a character's disappearance caused by an obstacle and a screen end. FIG. 20 is a diagram showing FIG. 18 as viewed from the lateral side thereof for the convenience of explanation, in the same way as FIG. 19. In this case, the first character 41 moves rightward in FIG. 20.

In the game device 1 according to one or more embodiments of the present invention, when the CPU 21 determines that the subsequent first character 41 has moved out of the display screen on the television monitor 2 and reached a predetermined point, the CPU 21 displays the operation icon 44 which prompts the first player operating the subsequent first character 41 to input an operation, thereby performing the processing for preventing a character's disappearance.

The CPU 21 uses the internal view frustum 47 for the determination in the same way as in the drag processing of a character. Specifically, the CPU 21 determines as to whether or not a distance D between a position P3 of the subsequent first character 1 and a position P3' which is a point closest to the position of the subsequent first character 41 in the determination plane 48 of the internal view frustum 47 closest to the position of the subsequent first character 41 has become equal to or larger than a predetermined value. When determining that the distance D has become equal to or larger than the predetermined value, the CPU 21 performs controls so as to display the operation icon 44 which prompts the first player operating the subsequent first character 41 to input an operation. For example, the CPU 21 can perform controls so as to display an operation icon 44 which prompts the first player to input an operation in the reverse direction of the moving direction of the subsequent first character 41. The CPU 21 may also preset types of input (the direction in which an operation is prompted, a specific operation of buttons, etc.) for each determination plane of the internal view frustum 47 and perform controls so as to display an operation icon 44 for prompting input of the type that is preset for the determination plane 48 which is closest to the position of the subsequent first character 41 when the processing for preventing a character's disappearance is started.

For example, when the subsequent first character 41 has crossed over the closest determination plane 48 of the internal view frustum 47 toward the outside of the internal view frustum 47, the CPU 21 performs processing for moving, by taking the shortest way, the subsequent first character 41 to the position P2 on the line of intersection between the closest determination plane 48 of the internal view frustum 47 and the ground. However, since the obstacle 43 exists ahead of the subsequent first character 41, the CPU 21 makes a determination of collision between the subsequent first character 41 and the obstacle 43. Thus, the CPU 21 cannot move the subsequent first character 41 further from the position P1. In this situation, when the game image on the television monitor 2 is further scrolled in the moving direction and the determination plane 48 moves rightward in FIG. 20, the distance D also increases accordingly. When the distance D becomes equal to or larger than a predetermined value, the CPU 21 performs controls so as to display the operation icon 44 for prompting the player operating the subsequent first character 41 to input operation.

Figure 21:
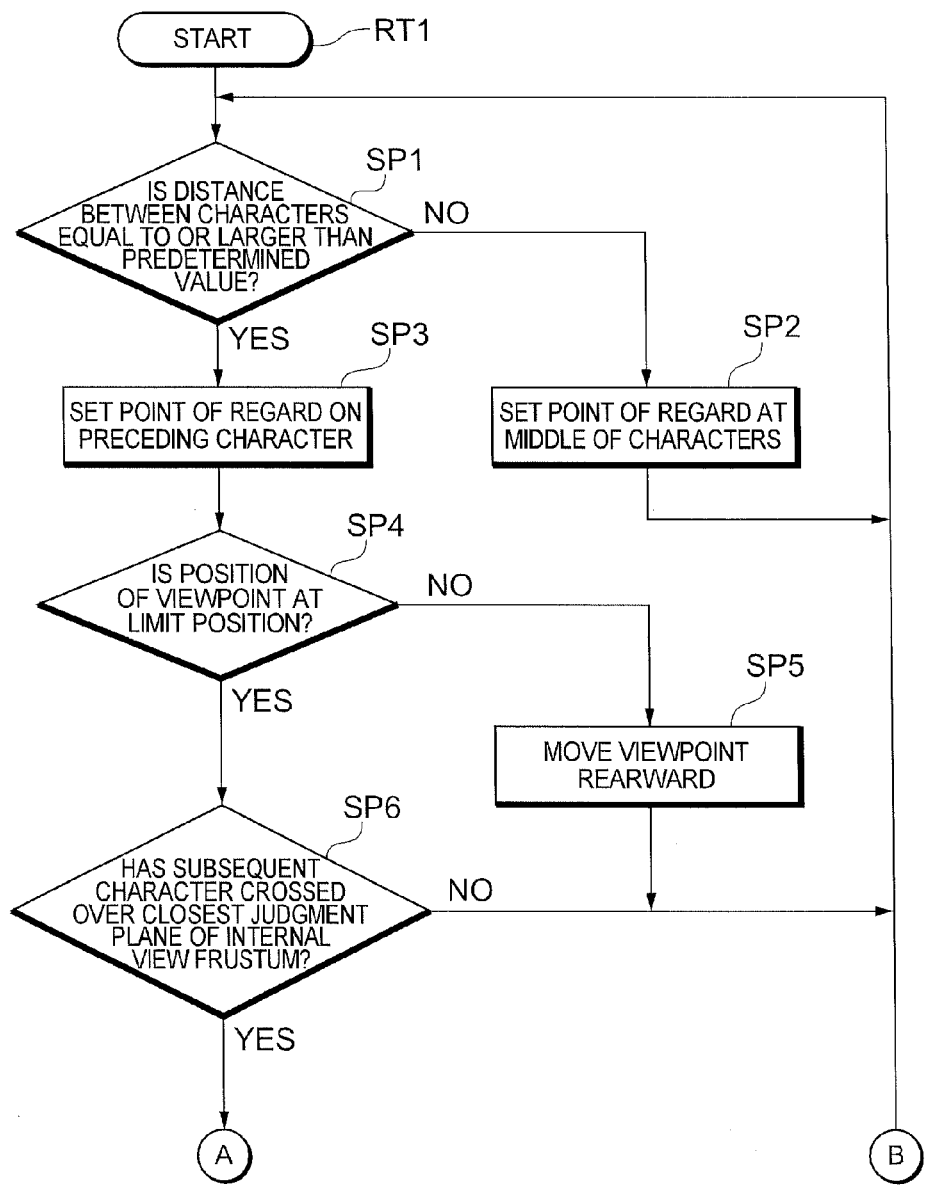
FIG. 21 is an example flowchart showing a specific processing procedure of the CPU in accordance with one or more embodiments of the present invention.
Figure 22:
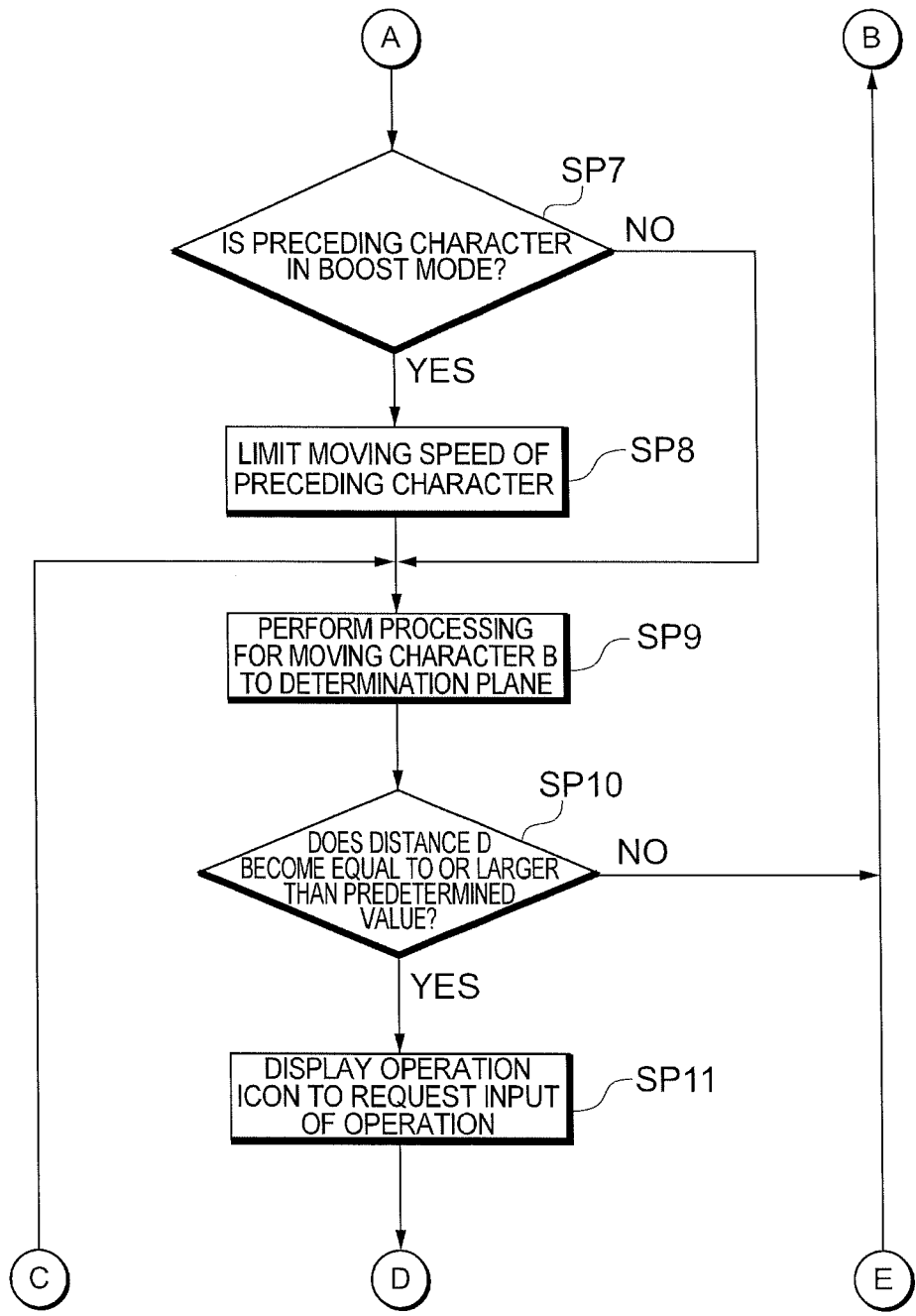
FIG. 22 is an example flowchart showing the specific processing procedure of the CPU in accordance with one or more embodiments of the present invention.
Figure 23:
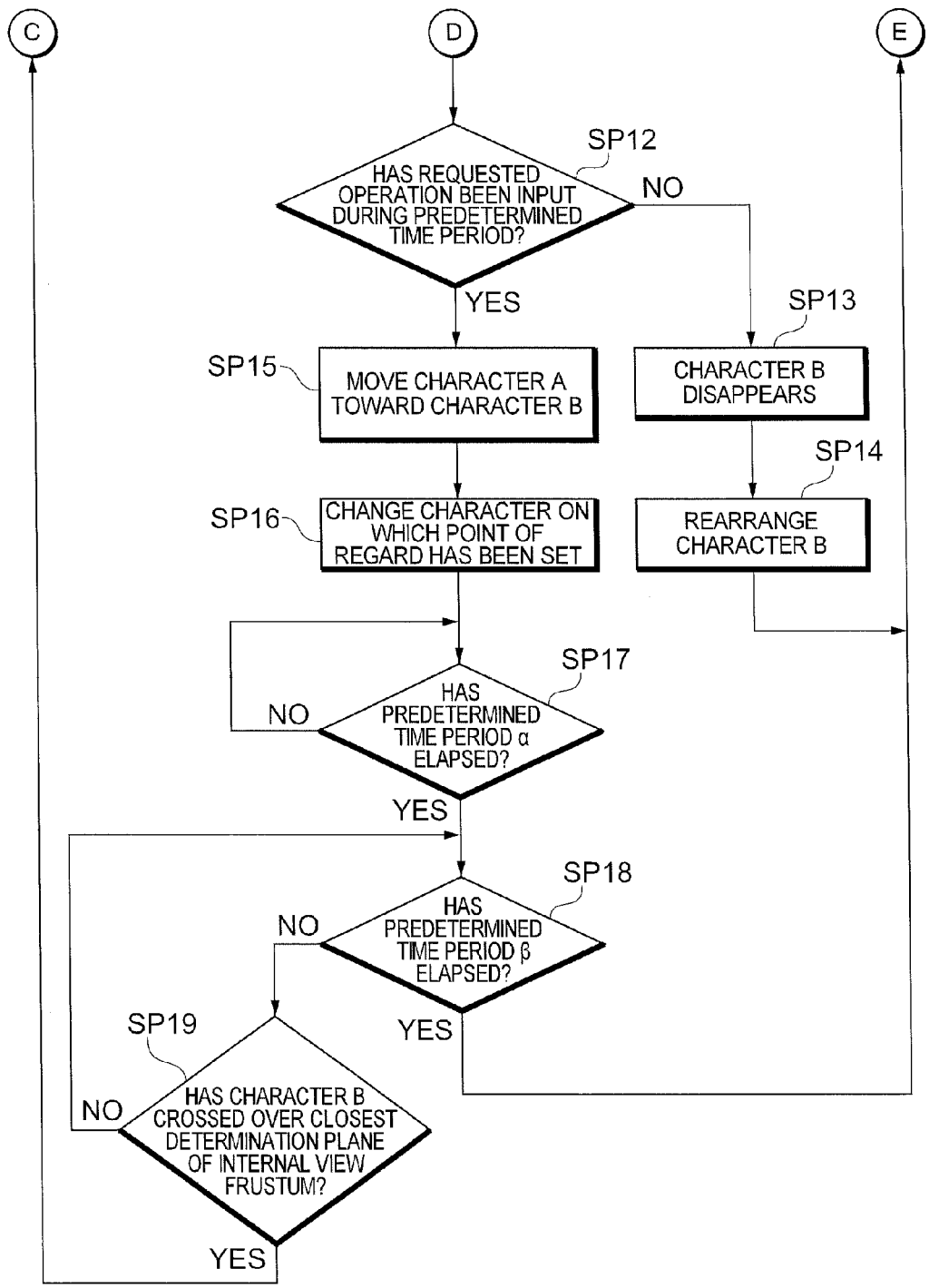
FIG. 23 is an example flowchart showing the specific processing procedure of the CPU in accordance with one or more embodiments of the present invention.

Next, the operations of the CPU 21 in the game device 1 according to one or more embodiments of the present invention will be explained in detail. FIGS. 21-23 are flowcharts showing specific processing RT1 of the CPU 21 in the game device 1 in accordance with one or more embodiments of the present invention. One or more embodiments of the present invention describes the situation in which the second character 42 takes a lead, followed by the first character.

When a multiplayer game played by a plurality of players at the same time is started by the players' operations, the CPU 21 checks as to whether or not the distance between the preceding second character 42 and the subsequent first character becomes equal to or larger than a predetermined value (Step SP1). When determining that the distance is not larger than the predetermined value (Step SP1: NO), the CPU 21 sets a point of regard having a scrolling authorization, which is an authorization for moving the game image on the television monitor 2, at the middle position of these characters based on position information of the preceding second character 42 and the subsequent first character 41, scrolls the game image on the television monitor 2 so that the point of regard is located at the center of the television monitor 2 (Step SP2) and then returns to Step S1 where the CPU 21 checks as to whether or not the distance between the preceding second character 42 and the subsequent first character 41 becomes equal to or larger than the predetermined value.

On the other hand, when determining that the distance becomes equal to or larger than the predetermined value (Step SP1: YES), the CPU 21 sets the point of regard having the scrolling authorization on the preceding second character 42 and scrolls the game image on the television monitor 2 in accordance with the movement of the preceding second character 42 (Step SP3).

The CPU 21 then checks as to whether or not the position of the viewpoint 45 is at a limit in a rear position (Step SP4). The limit is determined based on a preset movable range for the movement of the viewpoint in a forward and backward direction. The movable range of the viewpoint 45 is set in a viewable range of the first player and the second player based on the position information of the preceding second character 42 and the subsequent first character 41. When determining that the position of the viewpoint 45 is not at the limit of the rear position (Step SP4: NO), the CPU 21 moves the position of the viewpoint 45 backward by a predetermined distance (Step SP5) and then returns to Step SP1 where the CPU 21 checks as to whether or not the distance between the preceding second character 42 and the subsequent first character 41 becomes equal to or larger than the predetermined value. Since the field-of-view range is widened as a result of the above processing, the CPU 21 can control the second character 42 and the first character 41 so as to be displayed in the game screen with a larger space than before the movement. On the other hand, when determining that the viewpoint 45 is at the limit of the rear position, the field-of-view range cannot be further expanded by the movement of the viewpoint 45. In this state, a possibility arises in which the subsequent first character 41 might be out of the field-of-view range. Thus, when the position of the viewpoint 45 is at the limit of the rear position (Step SP4: YES), the CPU 21 checks as to whether or not the subsequent first character 41 has crossed over the closest determination plane 48 of the internal view frustum 47 toward the outside of the internal view frustum 47 (Step SP6).

When the subsequent first character 41 has not crossed over the determination plane 48 (Step SP6: NO), the CPU 21 then returns to Step S1 where the CPU 21 checks as to whether or not the distance between the preceding second character 42 and the subsequent first character 41 becomes equal to or larger than the predetermined value. On the other hand, when the subsequent first character 41 has crossed over the determination plane 48 (Step SP6: YES), the CPU 21 checks as to whether the preceding character 42 is in the boost mode or not in order to determine as to whether or not the function of limiting a character's moving speed has to be performed (Step SP7). When the preceding character 42 is not in the boost mode (Step SP7: NO), the CPU 21 proceeds to Step SP9 without performing the function of limiting character's moving speed. On the other hand, when the preceding character 42 is in the boost mode (Step SP7: YES), the CPU 21 performs the above-mentioned function of limiting character's moving speed to limit the speed of the preceding second character 42 (Step SP8).

Note that, in the following explanation, a character on which the point of regard having the scrolling authorization is set is referred to as the "character A," while a character on which the point of regard is not set is referred to as the "character B." First, the character A is the preceding second character 42 and the character B is the subsequent first character 41. If the character on which the point of regard is set is shifted, the character A will become the subsequent first character 41 and the character B will become the preceding second character 42. The CPU 21 thereafter changes the character A and character B in accordance with the shift in the character on which the point of regard is set.

The CPU 21 then performs processing for moving the character B to the closest determination plane 48 of the internal view frustum 47 (Step SP9). In this step, the character B should be moved to the position of the closest determination plane 48. However, if there is an object 43 located between the character B and the determination plane as shown in FIG. 15, the character B might be blocked by the obstacle 43 and stays at the position outside the determination plane 48. Thus, by checking as to whether or not the distance D between the position of the character B and the position of the point closest to the position of subsequent first character 41 in the determination plane 48 closest to the position of the character B of the internal view frustum 47 has become equal to or larger than a predetermined value (Step SP10), the CPU 21 determines the presence of the obstacle 43.

If the distance D is not equal to or larger than the predetermined value (Step SP10: NO), the CPU 21 determines that the character B has moved to the position of the determination plane 48 normally or that even though the character B stays at a position outside the determination plane 48, the character B is not spaced away from the above closest point by a distance larger than the distance D, and the CPU 21 does not perform the processing for preventing a character's disappearance and then returns to step SP1 where the CPU 21 checks as to whether or not the distance between the preceding second character 42 and the subsequent first character 41 becomes equal to or larger than the predetermined value. On the other hand, if the distance D has become equal to or larger than the predetermined value (Step SP10: YES), the CPU 21 performs the processing for preventing a character's disappearance caused by the obstacle and the screen end and displays the operation icon 44 requesting that the player operating the character B input an operation in the reverse direction of the moving direction (Step SP11).

The CPU 21 then checks as to whether or not the operation requested by the operation icon 44 has been input by the player operating the character B within a predetermined time period (Step SP12). If the operation requested by the operation icon 44 has not been input within the predetermined time period or there has been a failure to input the requested operation (Step SP12: NO), the CPU 21 controls the character B to disappear (Step SP13). The CPU 21 then rearranges a remaining character B that the player of the character B can play, if any, in the display screen on the television monitor 2 and starts a new game (Step SP14) and then returns to the Step SP1 where the CPU 21 checks as to whether or not the distance between the preceding second character 42 and the subsequent first character 41 becomes equal to or larger than the predetermined value.

On the other hand, if the operation requested by the operation icon 44 has been input within the predetermined time period (Step SP12: YES), the CPU 21 forcibly moves the character A toward the character B (Step SP15). The CPU 21 shifts the character on which the point of regard is set (i.e., the CPU 21 sets the point of regard on the character (character B) on which the point of regard has not been set until then and shifts the character (character A) on which the point of regard has been set until then to a character (character B) on which the point of regard is not set) and scrolls the game image on the television monitor 2 in accordance with the movement of the character A (Step SP16). Accordingly, in this case, the CPU 21 moves the game image in the direction reverse to the moving direction in order to display the character A in the display screen on the television monitor 2. Note that the CPU 21 shifts a character on which the point of regard is set by moving the point of regard from the position of the character A to the position of the character B and setting the point of regard near the character B.

After initially shifting the character on which the point of regard has been set, the character A is the subsequent character 41 and the character B is the preceding second character 42.

The CPU 21 awaits in a standby mode until a predetermined time α has elapsed after performing Step SP16 (Step SP17). With this processing the CPU 21 can prevent the drag processing and the processing of preventing a character's disappearance in Steps SP10 to SP16 from being repeated frequently, as well as false operations accompanied with such frequent repetition, when resetting the point of regard. In addition, when the CPU 21 forcibly moves the character A toward the character B, it can control the character A so as to perform a unique operation, such as being blown away, within the predetermined time α.

The CPU 21 then checks as to whether or not a predetermined time period β has elapsed after performing Step SP17 (Step SP18). If the predetermined time period β has not elapsed (Step SP18: NO), the CPU 21 checks as to whether or not the character B has crossed over the closest determination plane 48 of the internal view frustum 47 toward the outside of the internal view frustum 47 (Step SP19).

If the character B has not crossed over the determination plane 48 (Step SP19: NO), the CPU 21 returns to Step SP18 where the CPU 21 checks as to whether or not the predetermined time period β has elapsed. On the other hand, if the character B has crossed over the determination plane 48 (Step SP19: YES), the CPU 21 then returns to Step SP9 where the CPU 21 moves the character B to the closest determination plane 48 of the internal view frustum 47.

Operations and Effects

As described above, in the game device 1, when the distance D between the position of the subsequent character 41 and the position of the point closest to the position of the subsequent first character 41 in the determination plane 48 of the internal view frustum 47 closest to the position of the subsequent character 41 has become equal to or larger than the predetermined value, the CPU 21 displays the operation icon 44 requesting that the player input an operation reverse to the moving direction, and if the operation requested by the operation icon 44 is input within the predetermined time period, the CPU 21 forcibly moves the preceding character 42 toward the subsequent character 41.

Accordingly, the first player operating the subsequent character 41 is provided with a chance for avoiding the character from being sandwiched by the object 43 and the screen end on the opposite side of the screen end in the moving direction and thus disappearing and the first player can prevent the character from disappearing easily. Consequently, in the game device 1 which can be played by a plurality of players, even if the players with different game skills play the game, both the skilled player and the less-skilled player can sufficiently enjoy the game, thereby achieving an exciting game device 1.

In the game device 1, since the CPU 21 awaits until the predetermined time period α has elapsed after performing Step SP16, the CPU 21 can prevent the drag processing and the processing for preventing character's disappearance in Steps SP10 to SP16 from being repeated frequently, as well as false operations accompanied with such frequent repetition, when resetting the point of regard. In addition, when the CPU 21 forcibly moves the character A toward the character B, it can control the character A so as to perform a unique operation, such as being blown away, in the predetermined time α.

In addition, in the game device 1, when the preceding character has crossed over the closest determination plane 48 in the internal view frustum 47 toward the outside of the internal view frustum 47 after performing the drag processing and the processing for preventing a character's disappearance for the subsequent characters 41 in Steps SP10 to SP16, the CPU 21 performs the drag processing and the processing for preventing a character's disappearance in Steps SP10 to SP16 for the preceding character 42. At this time, the CPU 21 performs the drag processing and the processing for preventing a character's disappearance in Steps SP10 to SP16 alternately for the subsequent character 41 and the preceding character 42. With such a configuration, the CPU 21 can avoid the subsequent character 41 and the preceding character 42 from being sandwiched by the obstacle 43 and the screen end on the opposite side of the screen end in the moving direction and thus disappearing.

In the game device 1, if the subsequent first character has crossed over the closest determination plane 48 in the internal view frustum 47 toward the outside of the internal view frustum 47 and the preceding character 42 is in the boost mode, the CPU 21 limits the speed of the preceding character 42. With such a configuration, the CPU 21 can prevent the first player from becoming unable to operate due to too fast progress of the game.

In the foregoing one or more embodiments, although the CPU 21 sets the viewpoint 45 at a given position in the virtual three-dimensional space and sets a field-of-view range (the view frustum 46) in the form of quadrangular truncated pyramid representing the virtual three-dimensional space as viewed from the viewpoint 45, the present invention is not limited thereto. The CPU 21 may determine the moving direction of the field-of-view range and set the screen end of the game image on the opposite side in the moving direction of the field-of-view range.

In the foregoing one or more embodiments, although the CPU 21 sets the two-dimensional plane of the view frustum 46 so as to be larger than the display screen on the television monitor 2 and sets the two-dimensional plane of the internal view frustum 47 so as to be smaller than the display screen on the television monitor 2, the present invention is not limited thereto. The CPU 21 may set the two-dimensional plane of the view frustum 46, the two-dimensional plane of the internal view frustum 47 and the display screen on the television monitor 2 so as to have the same size. With such a configuration, when at least one of a plurality of operated characters, being a first operated character, crosses over the screen end of the game image on the opposite side of the moving direction of the field-of-view range and reaches a predetermined point, the CPU 21 can generate an operation event for receiving a specific operation input by the operation means operating the first operated character.

Although the CPU 21 displays the operation icon 44 and requests that the operation reverse to the moving direction be input in the foregoing one or more embodiments, the present invention is not limited thereto. The CPU 21 may generate an operation event for receiving a specific operation input by the operation means operating the first operated character.

In the foregoing one or more embodiments, when the distance D between the position of the character B and the position of the point closest to the position of the subsequent first character 41 in the determination plane 48 of the internal view frustum 47 closest to the position of the character B has become equal to or larger than the predetermined value, the CPU 21 forcibly moves the character A toward the character B, but the present invention is not limited thereto. In a situation in which three or more operated characters by three or more players appear in a game, when the first character, which is at least one of the plurality of operated characters, has crossed over the screen end of the game image on the opposite side of the screen end in the moving direction of the field-of-view range and reached the predetermined point, the CPU 21 may generate an operation event.

In the foregoing one or more embodiments, if the operation requested by the operation icon 44 is input within the predetermined time period, the CPU 21 forcibly moves the character A toward the character B, but the present invention is not limited thereto. In a situation in which three or more operated characters by three or more players appear in a game, the CPU 21 may move a second operated character, which is at least an operated character closest to the screen end of the game image in the moving direction of the field-of-view range in the plurality of operated characters, toward the position of the first operated character.

Although the CPU 21 moves the game image reversely to the moving direction in order to display the character A in the display screen on the television monitor 2 in the foregoing one or more embodiments, the present invention is not limited thereto. The CPU 21 may shift the scrolling authorization of the game image, which has been set to the second operated character, to the first operated character in accordance with the movement of the second operated character toward the first operated character, and move the game image reversely to the moving direction.

In the foregoing one or more embodiments, the first character 41 and the second character 42 move rightward in the display screen on the television monitor 2 and, when the distance D becomes equal to or larger than the predetermined value, the CPU 21 displays the operation icon 44 for requesting that an operation reverse to the moving direction (leftward) be input. However, the present invention is not limited thereto. In a situation in which, for example, the character moves toward the deep side of the display screen and the distance D becomes equal to or larger than the predetermine value, the CPU 21 may display an operation icon 44 for requesting that an operation reverse to the moving direction (toward the front side) be input, or in a situation in which the character moves upward in the display screen and the distance D becomes equal to or larger than the predetermined value, the CPU may display an operation icon 44 for requesting that an operation reverse to the moving direction (downward) be input, and when the first operated character crosses over the screen end and reaches the predetermined point, the CPU 21 may generate an operation event for receiving a specific operation input by the operation means operating the first operated character.

Although the CPU 21 performs the function of preventing a character's disappearance caused by the obstacle and the screen end when the distance D becomes equal to or larger than the predetermined value in the foregoing one or more embodiments, the present invention is not limited thereto. The CPU 21 may perform the function of preventing a character's disappearance caused by the obstacle and screen end when, for example, determining that the subsequent character does not proceed in the moving direction during the drag processing. Alternatively, the CPU 21 may provide a collision determination region at the screen end so that it may perform the function of preventing a character's disappearance caused by the obstacle and the screen end when determining that the both sides of the character are sandwiched between the obstacle and the screen end. In this case, the drag processing is also performed based on the collision judgment with respect to the screen end.

Although the CPU 21 performs the drag processing in the foregoing one or more embodiments, the present invention is not limited thereto. If, for example, the CPU 21 does not perform the drag processing, the subsequent character might move out of the screen even when there is no obstacle, and thus the CPU 21 may perform processing for preventing a character's disappearance, which is similar to the processing for preventing a character's disappearance caused by the obstacle and the screen end, even when it does not perform the drag processing. The CPU 21 may perform the processing for preventing a character's disappearance in various cases where a character disappears.

Although the view frustum 46 and the internal view frustum 47 are formed in a quadrangular truncated pyramid in the foregoing one or more embodiments, the present invention is not limited thereto. The view frustum 46 and the internal view frustum 47 may have various types of frustum shapes such as a truncated circular cone or a polygonal truncated pyramid (e.g., a five-sided truncated pyramid and an eight-sided truncated pyramid).

One or more embodiments of the present invention can be applied to game devices which execute multiplayer games.

DESCRIPTION OF REFERENCE NUMERALS

1: game device, 2: television monitor, 4: display screen region, 11: game device body, 12: first controller (operation means), 13: second controller (operation means), 21: CPU (control means), 22: system memory, 23: storage unit, 24: BOOTRAM, 25: rendering processor (rendering means), 26: sound processor, 27: communication interface, 28: radio receiving part, 29: peripheral interface, 30: bus arbiter, 31: graphic memory, 32: video DAC, 33: sound memory, 34: audio DAC, 35: LAN adapter, 41: first character, 42: second character, 43: obstacle, 44: operation icon, 45: viewpoint, 46: view frustum, 47: internal view frustum, 48: determination plane

What is claimed is:

1. A non-transitory computer-readable medium (CRM) storing a plurality of instructions for controlling a game device to facilitate a game, wherein the game device comprises at least a first operation input means which receives first operation input from a first player to operate a first virtual character in the game and at least a second operation input means which receives second operation input from a second player to operate a second virtual player in the game, a control means which arranges a viewpoint and at least the first and the second virtual characters in a virtual three-dimensional space, and a rendering means which projects the first and the second virtual characters present in a field-of-view range from the viewpoint to a two-dimensional plane to create a game image, the plurality of instructions, which when executed by at least one processor, cause the at least one processor to:
  move the first virtual character in the virtual three-dimensional space in accordance with the first operation input received from the first operation input means and move the second virtual character in the virtual three-dimensional space in accordance with the second operation input received from the second operation input means;
  determine a moving direction of the field-of-view range;
  set a screen end of a display area of the game image on an opposite side of the moving direction of the field-of-view range;
  generate, if the first virtual character is located at a predetermined point outside the screen end, an operation event for receiving a specific predetermined operation input at the first operation input means from the first player, wherein the operation event is an indication on the display area of the game image prompting the first player to perform the specific predetermined operation;
  if the specific predetermined operation is received within a predetermined time after the operation event is generated, force movement of at least the second virtual character toward a position of the first virtual character without receiving any input at the second operation input means from the second player, wherein, the second virtual character is closest to the screen end of the game image in the moving direction of the field-of-view range; and
  if the specific predetermined operation is not received within the predetermined time after the operation event is generated, causing at least one of (i) the first virtual character to remain outside the screen end, and (ii) the first virtual character to be removed from game play in the game.

2. The non-transitory CRM of claim 1, wherein, when moving at least the second virtual character, a scrolling authorization being an authorization for moving the game image is shifted from the second virtual character to the first virtual character in accordance with the movement of the second virtual character toward the first virtual character and moving the game image reversely to the moving direction.

3. The non-transitory CRM of claim 2, wherein, the plurality of instructions, which when executed by the at least one processor, further cause the at least one processor to:
  determine whether or not a distance between a position of the second virtual character and a position of a point in the screen end closest to the position of the second virtual character becomes equal to or larger than a predetermined value after a predetermined time period has elapsed after moving the game image reversely to the moving direction and generating the operation event when the distance becomes equal to or larger than the predetermined value; and
  if the specific predetermined operation is received within the predetermined time period after the operation event is generated, force movement of the first virtual character toward the position of the second virtual character.

4. The non-transitory CRM of claim 1,
  wherein, when setting the screen end of the display area, the field-of-view range is set as a view frustum having a predetermined truncated pyramid shape; and
  wherein, when generating the first virtual character, it is determined as to whether or not a distance between the position of the first virtual character and the position of a point in the internal view frustum closest to the position of the first virtual character becomes equal to or larger than a predetermined value and the operation event for receiving the specific predetermined operation from the first operation input means operating the first virtual character is generated when the distance becomes equal to or larger than the predetermined value.

5. The non-transitory CRM of claim 1, wherein, when generating the first virtual character, it is determined as to whether or not the first virtual character has crossed over the screen end and, if the first virtual character has crossed over the screen end and the second virtual character is in a mode of moving at a speed faster than a normal speed, the speed of the second virtual character is limited.

6. A non-transitory computer-readable medium (CRM) storing a plurality of instructions for controlling a game device to facilitate a game, wherein the game device comprises at least a first operation input means which receives first operation input from a first player to operate a first virtual character in the game and at least a second operation input means which receives second operation input from a second player to operate a second virtual player in the game, a control means which arranges a viewpoint, a point of regard, and at least the first and the second virtual characters in a virtual three-dimensional space, and a rendering means which determines a field-of-view range based on the viewpoint and the point of regard and projects the first and the second virtual characters present in the field-of-view range to a two-dimensional plane to create a game image, the plurality of instructions, which when executed by at least one processor, cause the at least one processor to:
  move the first virtual character in the virtual three-dimensional space in accordance with the first operation input received from the first operation input means and move the second virtual character in the virtual three-dimensional space in accordance with the second operation input received from the second operation input means;
  determine positions of the viewpoint and the point of regard based on position information of at least one of the first virtual character and the second virtual character;
  generate, if the first virtual character moves out of the field-of-view range, an operation event for receiving a specific predetermined operation input at the first operation input means from the first player, wherein the operation event is an indication on a display area of the game image prompting the first player to perform the specific predetermined operation;
  if the specific predetermined operation is received within a predetermined time after the operation event is generated, force movement of at least the point of regard toward a position of the first virtual character without receiving any input at the second operation input means from the second player; and
  if the specific predetermined operation is not received within the predetermined time after the operation event is generated, cause at least one of (i) the first virtual character to remain outside the screen end, and (ii) the first virtual character to be removed from game play in the game.

7. A game device to facilitate a game comprising:
at least a first controller which receives first operation input from a first player to operate a first virtual character in the game;
at least a second controller which receives second operation input from a second player to operate a second virtual player in the game;
a CPU which arranges a viewpoint and at least the first and second virtual characters in a virtual three-dimensional space; and
a rendering processor which projects the first and the second virtual characters present in a field-of-view range from the viewpoint to a two-dimensional plane to create a game image,
wherein the CPU is configured to:
move at least the first and second virtual characters in the virtual three-dimensional space;
decide a moving direction of the field-of-view range;
set a screen end of a display area of the game image on an opposite side of the moving direction of the field-of-view range;
if the first virtual character is located at a predetermined point outside the screen end, generate an operation event for receiving a specific predetermined operation input at the first controller from the first player, wherein the operation event is an indication on the display area of the game image prompting the first player to perform the specific predetermined operation; and
if the specific predetermined operation is received within a predetermined time after the operation event is generated, forcibly move at least the second virtual character toward a position of the first virtual character without receiving any input at the second controller from the second player, wherein, the second virtual character is closest to the screen end of the game image in the moving direction of the field-of view range,
wherein if the specific predetermined operation is not received within the predetermined time after the operation event is generated, the CPU is configured to cause at least one of (i) the first virtual character to remain outside the screen end, and (ii) the first virtual character to be removed from game play in the game.

8. A method of controlling a game device to facilitate a game, wherein the game device comprises at least a first operation input means which receives first operation input from a first player to operate a first virtual character in the game and at least a second operation input means which receives second operation input from a second player to operate a second virtual player in the game, a control means which arranges a viewpoint and at least the first and the second virtual characters in a virtual three-dimensional space, and a rendering means which projects the first and the second virtual characters present in a field-of-view range from the viewpoint to a two-dimensional plane to create a game image, wherein the method comprises:
moving the first virtual character in the virtual three-dimensional space in accordance with the first operation input received from the first operation input means and moving the second virtual character in the virtual three-dimensional space in accordance with the second operation input received from the second operation input means;
deciding a moving direction of the field-of-view range;
setting a screen end of a display area of the game image on an opposite side of the moving direction of the field-of-view range;
generating, if the first virtual character is located at a predetermined point outside the screen end, an operation event for receiving a specific predetermined operation input at the first operation input means from the first player, wherein the operation event is an indication on the display area of the game image prompting the first player to perform the specific predetermined operation;
if the specific predetermined operation is received within a predetermined time after the operation event is generated, forcibly moving at least the second virtual character toward a position of the first virtual character without receiving any input at the second operation input means from the second player, wherein, the second virtual character is closest to the screen end of the game image in the moving direction of the field-of-view range; and
if the specific predetermined operation is not received within the predetermined time after the operation event is generated, causing at least one of (i) the first virtual character to remain outside the screen end, and (ii) the first virtual character to be removed from game play in the game.

* * * * *